United States Patent
Zhu et al.

(10) Patent No.: US 11,870,596 B2
(45) Date of Patent: Jan. 9, 2024

(54) SYSTEMS AND DEVICES FOR POWER SUPPLY

(71) Applicant: ZHEJIANG DAHUA TECHNOLOGY CO., LTD., Zhejiang (CN)

(72) Inventors: Haigang Zhu, Hangzhou (CN); Dewu Li, Hangzhou (CN); Wei Fang, Hangzhou (CN); Yinchang Yang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 250 days.

(21) Appl. No.: 17/452,060

(22) Filed: Oct. 23, 2021

(65) Prior Publication Data

US 2022/0060343 A1    Feb. 24, 2022

Related U.S. Application Data

(63) Continuation of application No. PCT/CN2019/129750, filed on Dec. 30, 2019.

(30) Foreign Application Priority Data

Jun. 20, 2019   (CN) .......................... 201910538883.4

(51) Int. Cl.
*H04L 12/10*   (2006.01)
*H04L 12/14*   (2006.01)

(52) U.S. Cl.
CPC .......... *H04L 12/10* (2013.01); *H04L 12/1453* (2013.01)

(58) Field of Classification Search
CPC ...... H04L 12/10; H04L 12/1453; H04L 12/14
See application file for complete search history.

(56) References Cited

U.S. PATENT DOCUMENTS

2011/0241425 A1   10/2011  Hunter, Jr. et al.
2017/0272260 A1   9/2017   Han et al.
(Continued)

FOREIGN PATENT DOCUMENTS

CN    202111717 U    1/2012
CN    103606970 A    2/2014
(Continued)

OTHER PUBLICATIONS

The Extended European Search Report in European Application No. 19934274.2 dated Mar. 16, 2022, 7 pages.
(Continued)

*Primary Examiner* — Robert L Deberadinis
(74) *Attorney, Agent, or Firm* — METIS IP LLC

(57) ABSTRACT

A power sourcing equipment is provided. The power sourcing equipment may include an input terminal, an output terminal, a switch, and a device detection circuit. The input terminal may receive a power signal. The output terminal may be electrically coupled to a powered device via a coaxial cable, which transmits the power signal from the power sourcing equipment to the powered device or a data signal from the powered device to the power sourcing equipment. The switch may control an electrical connection between the input and output terminal(s). The device detection circuit may detect whether the data signal is being transmitted from the powered device to the power sourcing equipment. If the data signal is not being transmitted from the powered device to the power sourcing equipment, the device detection circuit may control an operation of the switch based on an electrical parameter associated with the powered device.

20 Claims, 11 Drawing Sheets

(56) References Cited

U.S. PATENT DOCUMENTS

2019/0089561 A1  3/2019  Chen
2020/0185961 A1  6/2020  Ye et al.

FOREIGN PATENT DOCUMENTS

| CN | 204559753 U | 8/2015 |
| --- | --- | --- |
| CN | 104994269 A | 10/2015 |
| CN | 106303342 A | 1/2017 |
| CN | 107333085 A | 11/2017 |
| CN | 207399229 U | 5/2018 |
| CN | 207677885 U | 7/2018 |
| JP | 2005159554 A | 6/2005 |
| WO | 2016020122 A1 | 2/2016 |
| WO | 2020253208 A1 | 12/2020 |

OTHER PUBLICATIONS

International Search Report in PCT/CN2019/129750 dated Mar. 27, 2020, 4 pages.
Written Opinion in PCT/CN2019/129750 dated Mar. 27, 2020, 6 pages.
First Office Action in Chinese Application No. 201910538883.4 dated May 27, 2020, 13 pages.
Keith Jack, Video Demystified, A Handbook for the Digital Engineer Fifth Edition, Posts & Telecom Press, 2009, Part One, 50 pages.
Keith Jack, Video Demystified, A Handbook for the Digital Engineer Fifth Edition, Posts & Telecom Press, 2009, Part Two, 50 pages.
Keith Jack, Video Demystified, A Handbook for the Digital Engineer Fifth Edition, Posts & Telecom Press, 2009, Part Three, 34 pages.

SYSTEMS AND DEVICES FOR POWER SUPPLY

CROSS-REFERENCE TO RELATED APPLICATIONS

This application is a continuation of International Patent Application No. PCT/CN2019/129750, filed on Dec. 30, 2019, which claims priority to Chinese Patent Application No. 201910538883.4, filed on Jun. 20, 2019, the content of which is hereby incorporated by reference to its entirety.

TECHNICAL FIELD

The present application generally relates to power supply technology, and more particularly, to systems and devices for Power over Coaxial.

BACKGROUND

Power over Coaxial (PoC) technique is widely used in data (e.g., a network signal, a video signal, an image signal, an audio signal) and electricity transmission. The PoC technique may transmit a power signal and a data signal via a coaxial cable. A PoC system may include a power sourcing equipment, a powered device, and the coaxial cable connecting the power sourcing equipment with the powered device.

In some embodiments, the type of the powered device (e.g., a PoC device and a non-PoC device) may affect the working condition of the PoC system. For example, if the powered device is a PoC device that is not powered on, the power sourcing equipment may need to transmit the power signal to the powered device via the coaxial cable. As another example, if the powered device is a PoC device that has been powered by an external power supply, the power sourcing equipment may not supply the power signal to the PoC device, or else the PoC device may be damaged. As yet another example, if the powered device is a non-PoC device, the power sourcing equipment cannot supply the power signal to it via the coaxial cable.

Additionally, the state of the powered device may affect the working condition of the PoC system. For example, if a load of the powered device changes (e.g., the load is disconnected), the power sourcing equipment may accordingly change its operation.

SUMMARY

According to one aspect of the present disclosure, a power sourcing equipment is provided. The power sourcing equipment may include an input terminal, an output terminal, a switch, and a device detection circuit. The input terminal may be configured to receive a power signal. The output terminal may be electrically coupled to a powered device via a coaxial cable. The coaxial cable may be configured to transmit the power signal from the power sourcing equipment to the powered device or transmit a data signal from the powered device to the power sourcing equipment. The switch may be coupled between the input terminal and the output terminal. The switch may control an electrical connection between the input terminal and the output terminal. The device detection circuit may be coupled to the output terminal and the input terminal. The device detection circuit may be configured to detect whether the data signal is being transmitted from the powered device to the power sourcing equipment. In response to a determination that the data signal is not being transmitted from the powered device to the power sourcing equipment, the device detection circuit may control an operation of the switch based on an electrical parameter associated with the powered device.

In some embodiments, the power sourcing equipment may include a data signal filtering circuit and a power signal filtering circuit. The data signal filtering circuit may be coupled between the input terminal and the output terminal, and may be configured to filter the data signal. The power signal filtering circuit may be configured to filter the power signal.

In some embodiments, the device detection circuit may include a data signal detection circuit. The data signal detection circuit may be configured to detect whether the data signal is being transmitted from the powered device to the power sourcing equipment. The data signal detection circuit may be configured to acquire a pulse signal from a signal transmitted from the powered device, and extract information indicating a pulse width or a pulse frequency of the pulse signal. The data signal detection circuit may further be configured to determine whether the data signal is being transmitted from the powered device to the power sourcing equipment based on the information.

In some embodiments, the electrical parameter associated with the powered device may include a resistance of the powered device. The device detection circuit may include a resistor detection circuit. The resistor detection circuit may be configured to determine the resistance of the powered device. The device detection circuit may control the operation of the switch based on whether the resistance of the powered device satisfies a first preset condition.

In some embodiments, the resistor detection circuit may include a second switch, a voltage generation circuit, a current sampling circuit, a first resistor, and a second processing sub-circuit. The second switch, whose first end is coupled to the output terminal, may be configured to be turned on when the data signal detection circuit does not detect the data signal. The voltage generation circuit may be coupled to a second end of the second switch, and be configured to provide a voltage for the powered device when the second switch is turned on. The current sampling circuit may be coupled to the second end of the second switch, and be configured to sample a current of the output terminal to obtain a sampling current when the second switch is turned on. The first resistor may be coupled to the current sampling circuit. The second processing sub-circuit may be configured to determine the resistance of the powered device based on a voltage across the first resistor and the sampling current.

In some embodiments, the electrical parameter associated with the powered device may include a capacitance of the powered device. The device detection circuit may include a capacitor detection circuit. The capacitor detection circuit may be configured to determine the capacitance of the powered device. The device detection circuit may control the operation of the switch based on whether the capacitance of the powered device satisfies a second preset condition.

In some embodiments, the capacitor detection circuit may include a third switch, a discharging sub-circuit, and a third processing sub-circuit. A first end of the third switch may be coupled to the output terminal. The discharging sub-circuit may be coupled to a second end of the third switch, and be configured to discharge a current from the output terminal. The third processing sub-circuit may be configured to determine the capacitance of the powered device based on the discharging of the current.

In some embodiments, the power sourcing equipment may further include a load detection circuit. The load detection circuit may be configured to detect whether a load of the powered device is disconnected. In response to a determination that the load of the powered device is disconnected, the load detection circuit may turn off the switch.

In some embodiments, the load detection circuit may include a hysteresis comparator and a fourth processing sub-circuit. The hysteresis comparator may have a forward input coupled to the input terminal and an inverted input configured to receive a reference voltage. The fourth processing sub-circuit may be coupled to the output terminal of the hysteresis comparator, and be configured to control the operation of the switch according to an output signal of the hysteresis comparator.

In some embodiments, the power sourcing equipment may further include a data processing unit. The data processing unit may be configured to process the data signal. The data processing unit may include a second capacitor, a second resistor, and a data processing circuit. The second capacitor may be coupled to the power signal filtering circuit. A first end of the second resistor may be coupled to the power signal filtering circuit, and a second end may be grounded. The data processing circuit may be coupled to the second end of the second capacitor for processing the data signal.

According to another aspect of the present disclosure, a power sourcing equipment is provided. The power sourcing equipment may include an input terminal, an output terminal, a switch, and a load detection circuit. The input terminal may be configured to receive a power signal. The output terminal may be electrically coupled to a powered device via a coaxial cable. The coaxial cable may be configured to transmit the power signal from the power sourcing equipment to the powered device or transmit a data signal from the powered device to the power sourcing equipment. The switch may be coupled between the input terminal and the output terminal. When the switch is turned on, the power sourcing equipment may power on the powered device with the power signal. When the switch is turned off, the power sourcing equipment may be powered on by an external power source. The load detection circuit may be configured to determinate whether a load of the powered device is disconnected. A first determination criterion may be followed when the switch is turned on. A second determination criterion which is different from the first determination criterion may be followed when the switch is turned off.

In some embodiments, when the switch is turned on, the load detection circuit may be configured to determine a drop of voltage across a resistor in the path between the input terminal and the output terminal, and determine whether the load of the powered device is disconnected based on the drop of voltage across the resistor.

In some embodiments, when the switch is turned off, the load detection circuit may be configured to acquire a pulse signal from a signal transmitted from the powered device, and extract information indicating a pulse width or a pulse frequency of the pulse signal. When the switch is turned off, the load detection circuit may further be configured to determine whether the load of the powered device is disconnected based on the information.

In some embodiments, the load detection circuit may include a hysteresis comparator and a fourth processing sub-circuit. The hysteresis comparator may have a forward input coupled to the input terminal and an inverted input configured to receive a reference voltage. The fourth processing sub-circuit may be coupled to the output terminal of the hysteresis comparator, and be configured to control the operation of the switch according to an output signal of the hysteresis comparator.

In some embodiments, the forward input of the hysteresis comparator may be configured to receive a difference between a voltage at the input terminal and the drop of voltage across the resistor. The output signal of the hysteresis comparator may indicate a comparison result of the difference and the reference voltage.

In some embodiments, the fourth processing sub-circuit may be configured to determine whether the load of the powered device is disconnected based on the output signal and a duration of the output signal.

In some embodiments, the power sourcing equipment may further include a device detection circuit coupled to the output terminal and the input terminal. The device detection circuit may be configured to detect whether the data signal is being transmitted from the powered device to the power sourcing equipment. In response to a determination that the data signal is not being transmitted from the powered device to the power sourcing equipment, the device detection circuit may control an operation of the switch based on an electrical parameter associated with the powered device.

In some embodiments, the power sourcing equipment may further include a data signal filtering circuit and a power signal filtering circuit. The data signal filtering circuit may be coupled between the input terminal and the output terminal, and be configured to filter the data signal. The power signal filtering circuit may be configured to filter the power signal.

In some embodiments, the device detection circuit may include a data signal detection circuit. The data signal detection circuit may be configured to detect whether the data signal is being transmitted from the powered device to the power sourcing equipment. The data signal detection circuit may be configured to acquire a pulse signal from a signal transmitted from the powered device, and extract information indicating a pulse width or a pulse frequency of the pulse signal. The data signal detection circuit may further be configured to determine whether the data signal is being transmitted from the powered device to the power sourcing equipment based on the information.

In some embodiments, the electrical parameter associated with the powered device may include a resistance of the powered device. The device detection circuit may include a resistor detection circuit. The resistor detection circuit may be configured to determine the resistance of the powered device. The device detection circuit may control the operation of the switch based on whether the resistance of the powered device satisfies a first preset condition.

In some embodiments, the resistor detection circuit may include a second switch, a voltage generation circuit, a current sampling circuit, a first resistor, and a second processing sub-circuit. The second switch, whose first end is coupled to the output terminal, may be configured to be turned on when the data signal detection circuit does not detect the data signal. The voltage generation circuit may be coupled to a second end of the second switch, and be configured to provide a voltage for the powered device when the second switch is turned on. The current sampling circuit may be coupled to the second end of the second switch, and be configured to sample a current of the output terminal to obtain a sampling current when the second switch is turned on. The first resistor may be coupled to the current sampling circuit. The second processing sub-circuit may be configured to determine the resistance of the powered device based on a voltage across the first resistor and the sampling current.

In some embodiments, the electrical parameter associated with the powered device may include a capacitance of the powered device. The device detection circuit may include a capacitor detection circuit configured to determine the capacitance of the powered device. The device detection circuit may control the operation of the switch based on whether the capacitance of the powered device satisfies a second preset condition.

In some embodiments, the capacitor detection circuit may include a third switch, a discharging sub-circuit, and a third processing sub-circuit. A first end of the third switch may be coupled to the output terminal. The discharging sub-circuit may be coupled to a second end of the third switch, and be configured to discharge a current from the output terminal. The third processing sub-circuit may be configured to determine the capacitance of the powered device based on the discharging of the current.

In some embodiments, the power sourcing equipment may further include a data processing unit. The data processing unit may be configured to process the data signal. The data processing unit may include a second capacitor, a second resistor, and a data processing circuit. The second capacitor may be coupled to the power signal filtering circuit. A first end of the second resistor may be coupled to the power signal filtering circuit and a second end may be grounded. The data processing circuit may be coupled to the second end of the second capacitor for processing the data signal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
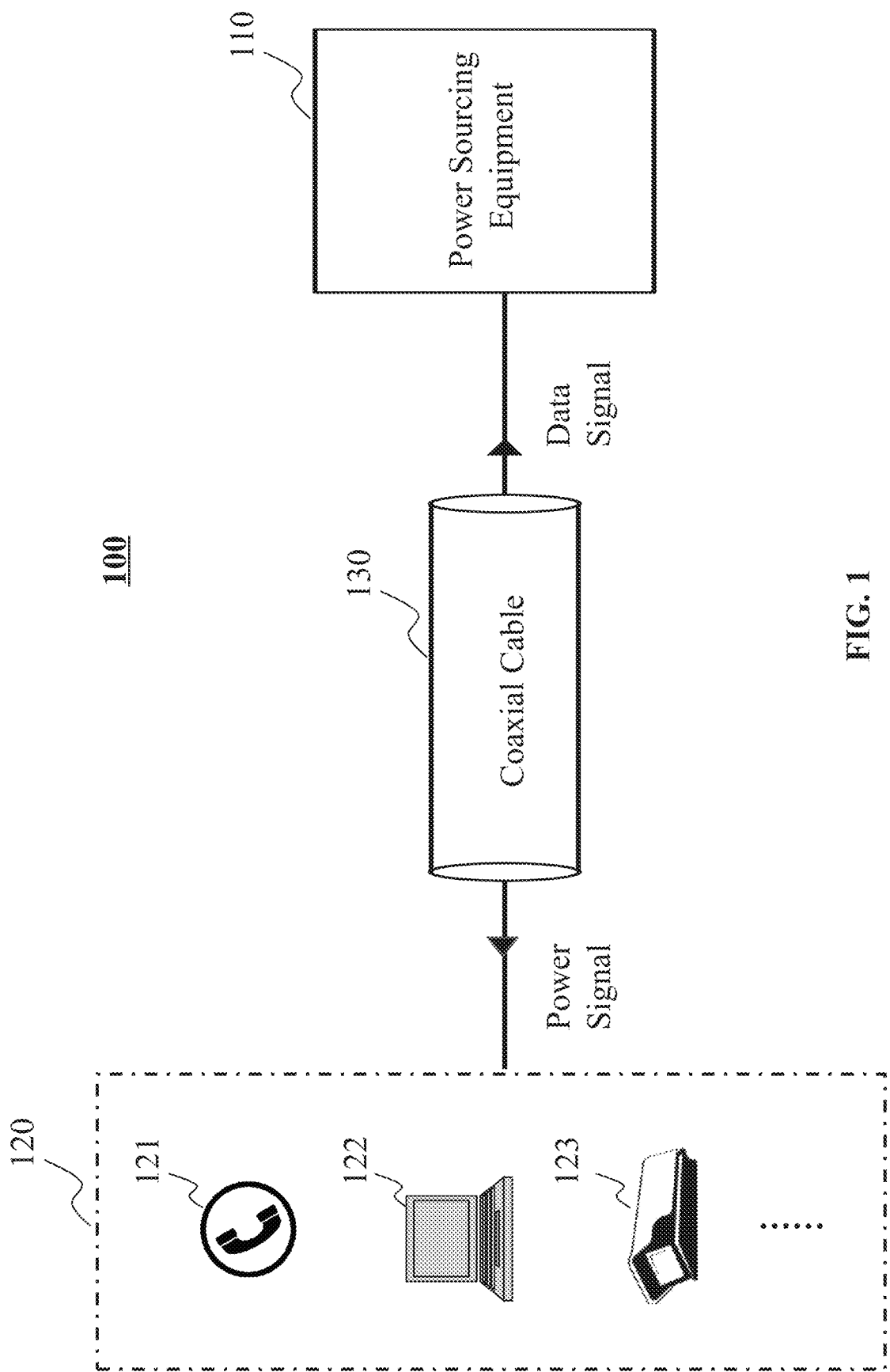
FIG. 1 is a schematic diagram of an exemplary PoC system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to a power sourcing equipment. The power sourcing equipment may include an input terminal, an output terminal, a switch, and a device detection circuit. The terminal may be configured to receive a power signal. The output terminal may be electrically coupled to a powered device via a coaxial cable. The coaxial cable may be configured to transmit the power signal from the power sourcing equipment to the powered device or transmit a data signal from the powered device to the power sourcing equipment. The switch may be coupled between the input terminal and the output terminal to control an electrical connection between the input terminal and the output terminal. When the switch is turned on, the power sourcing equipment may provide power to maintain the operation of the powered device. A device detection circuit, coupled to the output terminal and the input terminal, may be configured to detect whether the data signal is being transmitted from the powered device to the power sourcing equipment. In response to a determination that the data signal is not being transmitted from the powered device to the power sourcing equipment (i.e., the powered device has not been powered up), the device detection circuit may be configured to control an operation of the switch based on an electrical parameter associated with the powered device.

According to some embodiments of the present disclosure, under the circumstance that the powered device has not been powered up, the power sourcing equipment may first recognize the type of the powered device based on the electrical parameter associated with the powered device. By doing so, it can be guaranteed that the power sourcing equipment may provide power to the powered device only when the powered device is not being powered by any external power source, thus protecting the powered device from being damaged. In addition, since the recognition is performed in the absence of any data signal transmitted between the power sourcing equipment and the powered device, the influence caused by the data signal may be eliminated and thus the recognition result may be more accurate and reliable.

According to another aspect of the present disclosure, the power sourcing equipment may further include a load detection circuit. The load detection circuit may be configured to determinate whether a load of the powered device is disconnected. A first determination criterion may be followed when the switch is turned on (i.e., when the powered device is being powered by the power sourcing equipment), and a second determination criterion which is different from the first determination criterion may be followed when the switch is turned off (i.e., when the powered device is being powered by an external power source).

According to some embodiments of the present disclosure, the load detection circuit may use different determination criteria to determine whether the load of the powered device is disconnected in different scenarios. In the scenario that the powered device is powered by the power sourcing equipment itself, the load detection circuit may use a determination criterion according to which the determination result may not be affected by the capacitor (having a large capacitance) or the inductor (having a large inductance) of the power sourcing equipment. In the scenario that the powered device is powered by an external power source, the load detection circuit may use a determination criterion that takes the feature of the data signal into account, according to which the determination result may be more accurate and reliable.

FIG. 1 illustrates a schematic diagram of a PoC system 100 according to some embodiments of the present disclosure. The PoC system 100 may use a single coaxial cable to transmit both of the power signal and the data signal, which reduces the wiring cost and improves the convenience and security for installing the components of the PoC system 100. As used herein, the power signal may include a direct current (DC) signal. The data signal may include one or more alternating current (AC) signals (e.g., a network signal, a video signal, an image signal, an audio signal). As shown in FIG. 1, the PoC system 100 may include a power sourcing equipment (PSE) 110, a powered device (PD) 120, and a coaxial cable 130. The PSE 110 may be electrically coupled to the PD 120 via the coaxial cable 130.

The PSE 110 may be configured to supply electric power to the PD 120. In some embodiments, the PSE 110 may be used to manage a power supply process in the PoC system 100. The PSE 110 may have a similar function as a network switch (e.g., a Power over Ethernet (PoE) network switch) that supplies power to powered devices. In some embodiments, the PES 110 may be also used to obtain and process the data signal from the PD 120. For example, the PSE 110 may include a digital video recorder that receives the video signal from the PD 120 and performs a video processing operation on the video signal.

The PD 120 may be a device that is powered to realize certain functions, e.g., implementing the video surveillance. For example, the PD 120 may be powered by the PSE 110 by receiving the power signal via the coaxial cable 130, or the PD 120 may be powered by an external power source (not shown in FIG. 1) via other cables. The PD 120 may be a terminal device of the PoC system 100 that may generate the data signal and transmit the data signal to the PSE 110 for further processing. In some embodiments, the PD 120 may be a PoC device that supports a PoC technique or a non-PoC device which does not support the PoC technique. The PoC technique may refer to an operation of exchanging both of the power signal and the data signal between two devices via a coaxial cable. Merely by way of example, if the PD 120 is a PoC device, the PD 120 may receive the power signal from the PSE 110 to maintain the operation of itself and transmit the data signal (e.g., a video signal) produced by the PD 120 to the PSE 110 via the coaxial cable 130. Alternatively, the PD 120 may receive the power signal from an external power source other than the PSE 110, the PD 120 may still transmit the data signal to the PSE 110 via the coaxial cable 130. As another example, if the PD 120 is a non-PoC device, the PD 120 cannot be powered by an extra power source via a network cable other than the coaxial cable 130, and the coaxial cable may only be used to transmit the data signal from the PD 120 to the PSE 110. In some embodiments, the PD 120 may include an IP phone 121, a notebook computer 123, an IP camera 125, a Wireless Local Area Network access point (not shown in FIG. 1), or the like, or a combination thereof.

The coaxial cable 130 may be configured to exchange the power signal and/or the data signal between the PSE 110 and the PD 120. The coaxial cable 130 may be an RG-6 coaxial cable, a 75-5 coaxial cable, an RG-59 coaxial cable, an RG-58 coaxial cable, an RG-62 coaxial cable, an RG-7 coaxial cable, an RG-11 coaxial cable, or the like, or a combination thereof.

It should be noted that the above description of the PoC system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the PoC system 100 may include one or more additional components. Additionally or alternatively, one or more components of the PoC system 100 described above may be omitted. As another example, two or more components of the PoC system 100 may be integrated into a single component.

Figure 2:
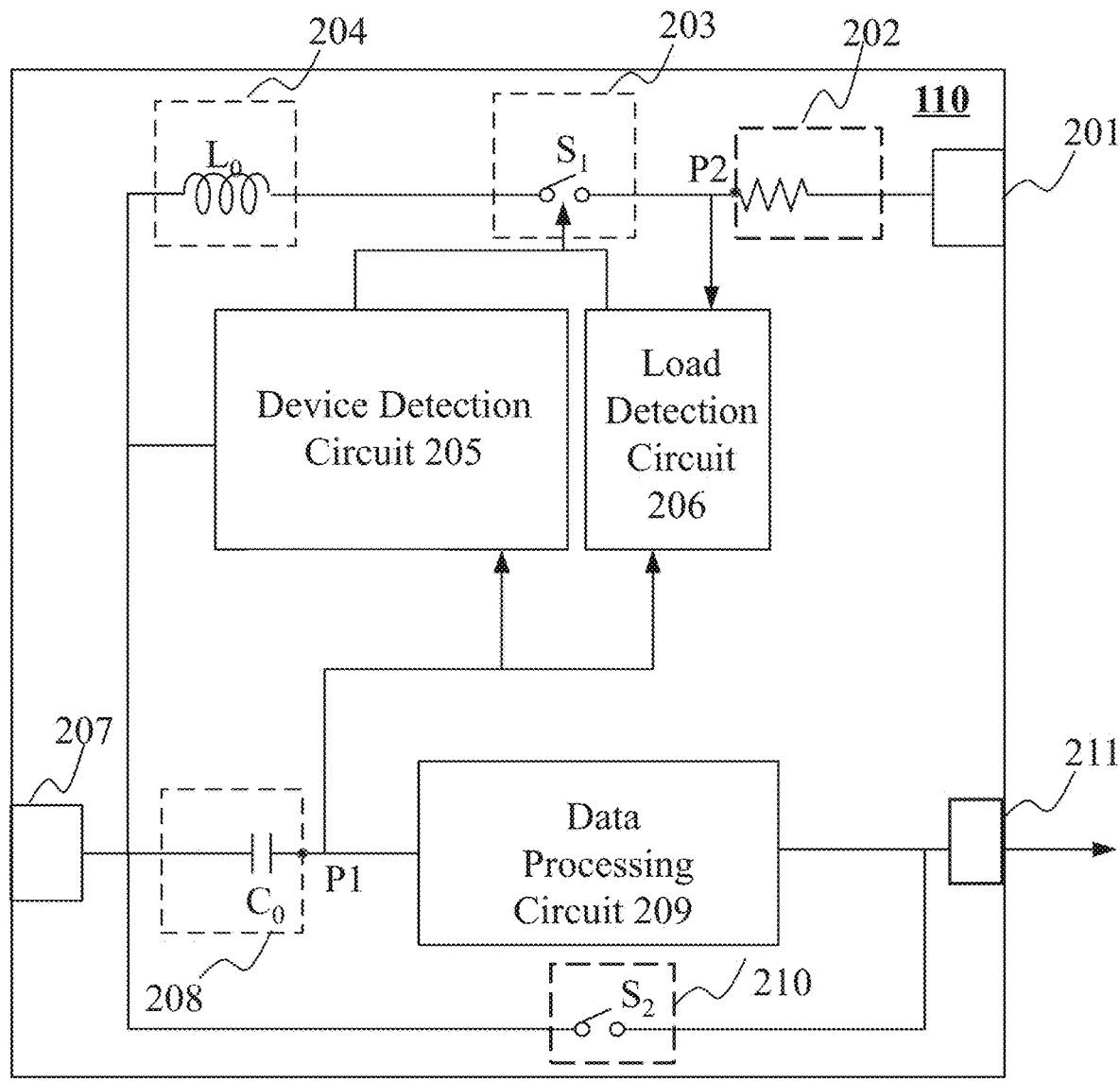
FIG. 2 is a schematic diagram illustrating an exemplary circuit of a power sourcing equipment according to some embodiments of the present disclosure.

FIG. 2 is a schematic diagram illustrating an exemplary circuit of the PSE 110 according to some embodiments of the present disclosure. As shown in FIG. 2, the PSE 110 may include an input terminal 201, a resistor 202, a switch 203, a data signal filtering circuit 204, a device detection circuit 205, a load detection circuit 206, an output terminal 207, a power signal filtering circuit 208, a data processing unit 209, a switch 210, and a data signal output terminal 211. The input terminal 201, the resistor 202, the switch 203, the data signal filtering circuit 204, and the output terminal 207 may be connected in series. The output terminal 207, the power signal filtering circuit 208, the data processing unit 209, and the data signal output terminal 211 may be connected in series. The output terminal 207, the switch 210, and the data signal output terminal 211 may be connected in series. The output terminal 207 may also be connected to the device detection circuit 205. The power signal filtering circuit 208 may also be coupled to the device detection circuit 205 and the load detection circuit 206, respectively. The device detection circuit 205 and the load detection circuit 206 may be coupled to the switch 203, respectively. The load detection circuit 206 may also be coupled to a first end P2 of the resistor 202. P1, as shown in FIG. 2, refers to a second end of the power signal filtering circuit 208.

The input terminal 201 may be coupled to a power supply (not shown in FIG. 2) to receive the power signal from the power supply.

The resistor 202 may be configured to protect the PSE 110 from being damaged due to large current. The resistor 202 may share the voltage of the power supply with a powered device (e.g., the PD 120 in FIG. 1) connected to the PSE 110.

The switch 203 may be configured to control an electrical connection between—the input terminal 201 and the output terminal 207. If the switch 203 is turned on, the power signal received from the power supply may be transmitted to the output terminal 207. If the switch 203 is turned off, the input terminal 201 and the output terminal 207 may be disconnected. The switch 203 may include a switch $S_1$ including a controlling end that receives a controlling signal. The control signal may be used to control the on or off of the switch $S_1$. In some embodiments, the switch $S_1$ may be a field effect tube (FET), such as an N-type FET. Taking the N-type FET as an exemplary switch $S_1$, if the control signal includes a high-level voltage (e.g., the device detection circuit 205 sends a high-level voltage to the controlling end), the switch $S_1$ may be turned on. If the control signal includes a low-level voltage (e.g., the device detection circuit 205 sends a low-level voltage to the controlling end), the switch $S_1$ may be turned off.

The data signal filtering circuit 204 and the power signal filtering circuit 208 may be used to separate the power signal and the data signal, respectively. For example, the data signal filtering circuit 204 may allow the power signal to pass through while filter out the data signal, such that no data signal may reach at the input terminal 201. In some embodiments, the power signal may be a DC signal and the data signal may be an AC signal. The data signal filtering circuit 204 may include an inductor $L_O$, which presents low impedance to a DC signal, and high impedance to an AC signal. Thus, the data signal filtering circuit 204 may allow the power signal to pass and block the AC signal. As shown in FIG. 2, the left end of the inductor $L_O$ may be coupled to the output terminal 207, and the right end of the inductor $L_O$ may be coupled to the switch 203. As another example, the power signal filtering circuit 208 may allow the data signal to pass through while filter out the power signal, such that no power signal may reach at the device detection circuit 205, the load detection circuit 206, and the data processing circuit 209. The power signal filtering circuit 208 may include a capacitor $C_O$, which presents low impedance to an AC signal, and high impedance to an DC signal. Thus, the power signal filtering circuit 208 may allow the data signal to pass and block the DC signal. As shown in FIG. 2, the left end of the capacitor $C_O$ may be coupled to the output terminal 207, and the right end of the capacitor $C_O$ may be coupled to the device detection circuit 205, the load detection circuit 206, and the data processing circuit 209.

The device detection circuit 205 may be configured to determine the operating status of a powered device connected to the PSE 110. For example, the device detection circuit 205 may judge whether the powered device is powered up by detecting whether any data signal is being transmitted from the powered device to the PSE 110. If no data signal is being transmitted from the powered device to the PSE 110, the device detection circuit 205 may determine that the powered device has not been powered up. Then, the device detection circuit 205 may further identify whether the powered device is of a target type (e.g., whether the powered device is a PoC device or not) based on an electrical parameter associated with the powered device, and control the operation of the switch 203 based on the identification result. For example, if the powered device is identified as a PoC device, the device detection circuit 205 may turn on the switch 203 such that the PSE 110 may directly provide power to the powered device via a coaxial cable. Exemplary electrical parameters associated with the powered device may include a resistance and a capacitance of the powered device. More descriptions regarding the device detection circuit 205 may be found elsewhere in the present disclosure. See, e.g., FIGS. 3, 4, 5 and 6 and relevant descriptions thereof.

The load detection circuit 206 may be configured to detect whether a load of the powered device is disconnected, and further control the operation of the switch 203 based on the detection result. For example, if the load of the powered device is disconnected, load detection circuit 206 may turn off the switch 203. More descriptions regarding the load detection circuit 206 may be found elsewhere in the present disclosure. See, e.g., FIG. 7 and relevant descriptions thereof.

The output terminal 207 may be electrically coupled to the powered device via a coaxial cable (e.g., the coaxial cable 130 in FIG. 1). The coaxial cable may be configured to transmit the power signal from the PSE 110 to the powered device and/or transmit the data signal from the powered device to the PSE 110.

The data processing unit 209 may be configured to process the data signal, which is received from the powered device and filtered by the power signal filtering circuit 208. For example, the data processing unit 209 may perform a lowpass filtering and a video compensation on the data signal to improve the quality of the data signal. More descriptions regarding the data processing unit 209 may be found elsewhere in the present disclosure. See, e.g., FIG. 8 and relevant descriptions thereof.

The switch 210 may be configured to control the electrical connection between the output terminal 207 and the data signal output terminal 211, so as to ensure the quality of the data signal. For example, if the powered device is powered up by an external power source other than the PSE 110, the switch 210 may be turned on, so that the data signal received by the output terminal 207 may be transmitted to the data signal output terminal 211 for output. In such case, the data signal received by the output terminal 207 may avoid the influence of, e.g., the capacitor $C_0$. As another example, if the powered device is powered up by the PSE 110, the switch 210 may be turned off, so that the data signal received by the output terminal 207 may be processed by the data processing circuit 209 to improve its quality.

The data signal output terminal 211 may be configured to output the data signal to, for example, a screen for display, or a storage device for storage.

Figure 3:
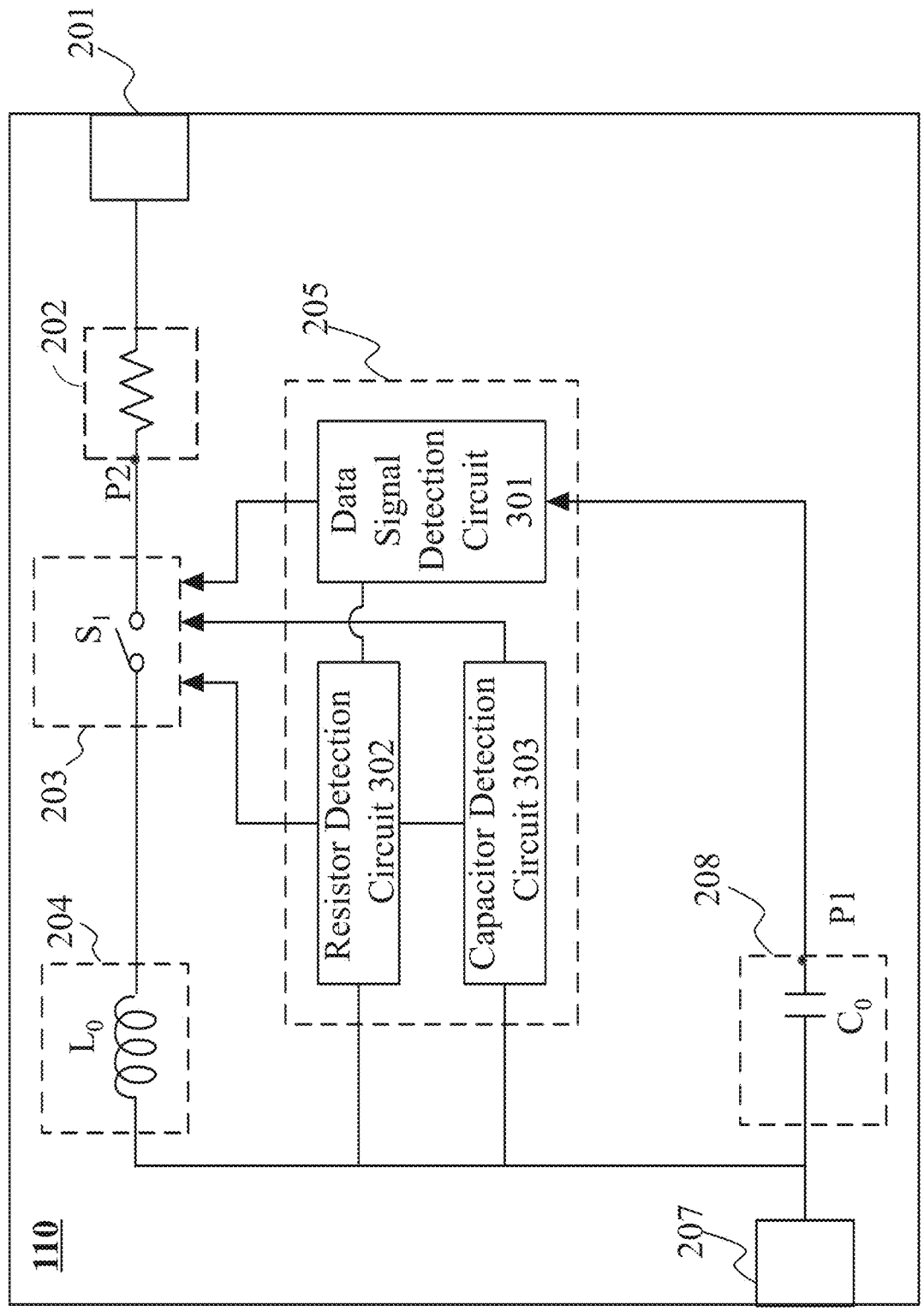
FIG. 3 is a schematic diagram illustrating another exemplary circuit of the power sourcing equipment according to some embodiments of the present disclosure.

FIG. 3 is a schematic diagram illustrating another exemplary circuit of the PSE 110 according to some embodiments of the present disclosure. As shown in FIG. 3, the device detection circuit 205 may include a data signal detection circuit 301, a resistor detection circuit 302, and a capacitor detection circuit 303. The data signal detection circuit 301 may be coupled to the second end of the power signal filtering circuit 208 and the switch 203. The resistor detection circuit 302 may be coupled to the data signal detection circuit 301, the output terminal 207, and the switch 203. The capacitor detection circuit 303 may be coupled to the resistor detection circuit 302, the output terminal 207, and the switch 203.

The data signal detection circuit 301 may be configured to detect whether a data signal is being transmitted from a powered device (e.g., the PD 120 in FIG. 1) to the PSE 110. If the data signal is being transmitted from the powered device to the PSE 110, the powered device may be regarded as being powered up (e.g., by an external power source other than the PSE 110). Otherwise, the powered device may be regarded as being not powered up, and one or more further operations may be applied. For example, an electrical parameter associated with the powered device may be determined by, e.g., the resistor detection circuit 302 and/or the capacitor detection circuit 303, and utilized to control an operation of the switch 203.

The resistor detection circuit 302 may be configured to determine whether a resistance of the powered device satisfies a first preset condition. In some embodiments, if the resistance of the powered device does not satisfy the first preset condition, the powered device may be regarded as a non-PoC device, and the switch 203 may not be turned on. In some embodiments, if the resistance of the powered device satisfies the first preset condition, the capacitor detection circuit 303 may further determine whether a capacitance of the powered device satisfies a second preset condition. If the capacitance of the powered device satisfies the second preset condition, the powered device may be regarded as a PoC device, and the switch 203 may be turned on so that the PSE 110 may supply the power signal to the powered device. If the capacitance of the powered device does not satisfy the second preset condition, the powered device may be regarded as a non-PoC device. More descriptions regarding the device detection circuit 205 may be found elsewhere in the present disclosure. See, e.g., FIGS. 4, 5 and 6 and relevant descriptions thereof. In some embodiments, the data signal detection circuit 301 may be omitted from the device detection circuit 205.

It should be noted that the above descriptions of the device detection circuit 205 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the working order of the data signal detection circuit 301, the resistor detection circuit 302, and the capacitor detection circuit 303 may not be limiting. For example, the resistor detection circuit 302 and the capacitor detection circuit 303 may work simultaneously. As another example, the capacitor detection circuit 303 may first determine whether the capacitance of the powered device satisfies the second preset condition. And if the capacitance of the powered device satisfies the second preset condition, the resistor detection circuit 302 may determine whether a resistance of the powered device satisfies a first preset condition.

Figure 4:
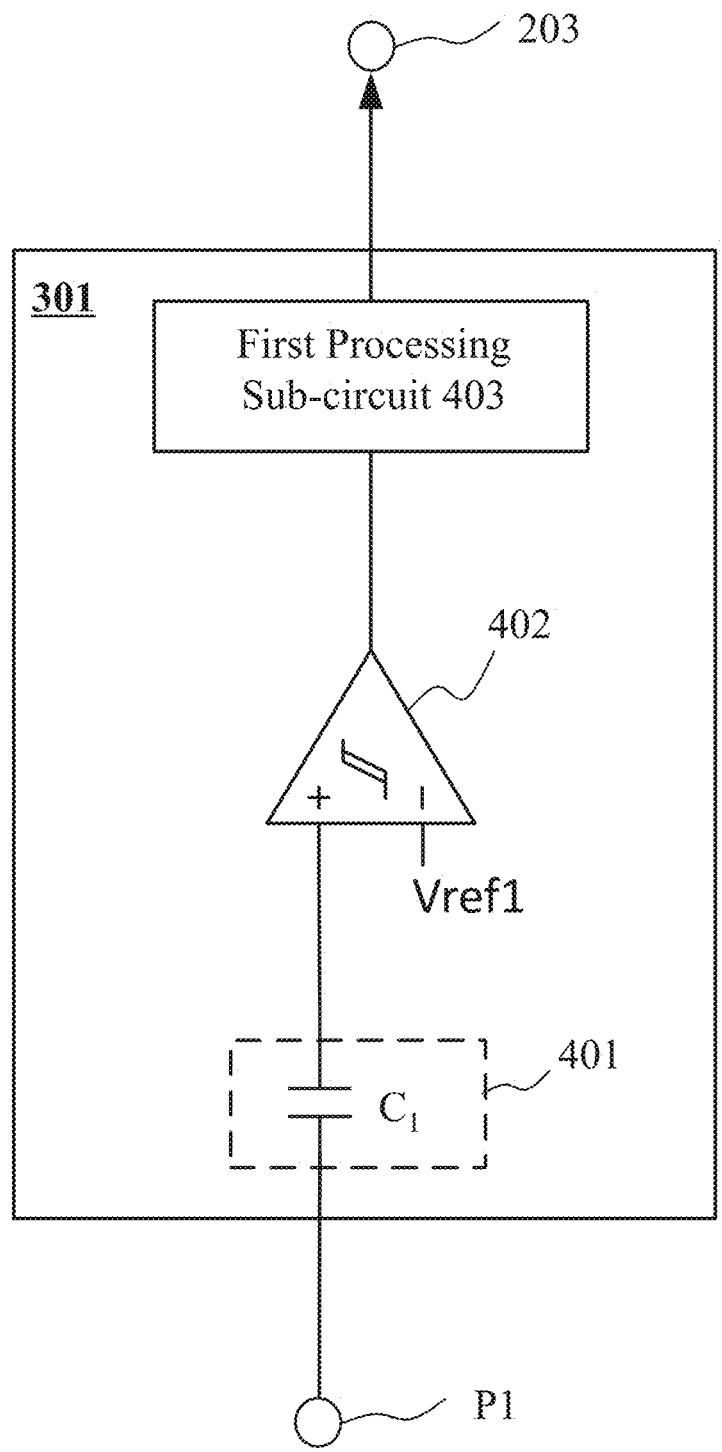
FIG. 4 is a schematic diagram illustrating an exemplary circuit of a data signal detection circuit according to some embodiments of the present disclosure.

FIG. 4 is a schematic diagram illustrating an exemplary circuit of the data signal detection circuit 301 according to some embodiments of the present disclosure. As shown in FIG. 4, the data signal detection circuit 301 may include a data signal filtering circuit 401, a hysteresis comparator 402, and a first processing sub-circuit 403. A first end of the data filtering circuit 401 may be coupled to the second end P1 of the power signal filtering circuit 208. The hysteresis comparator 402 may have a forward input coupled to a second end of the data filtering circuit 401 and an inverted input configured to receive a reference voltage Vref1. The first processing sub-circuit 403 may be coupled to an output terminal of the hysteresis comparator 402, and to the switch 203.

The data signal filtering circuit 401 may be configured to pass an AC signal and filter out a DC signal in a signal received from a powered device (e.g., the PD 120 in FIG. 1) via the power signal filtering circuit 208. In some embodiments, an AC bias may be added to the AC signal, or an STC clamping circuit may be set between the data signal filtering circuit 401 and the hysteresis comparator 402. In this way, a DC signal level at the forward input terminal of the hysteresis comparator 402 may be reset to a certain value within a common-mode voltage range of the hysteresis comparator 402. In some embodiments, the data filtering circuit 401 may include a capacitor $C_1$.

The hysteresis comparator 402 may be configured to acquire a pulse signal based on an input of the AC signal and the reference voltage Vref1. The pulse signal may denote the synchronous head of the input AC signal. A value of the reference voltage Vref1 may be associated with the certain value at the forward input terminal of the hysteresis comparator 402. Based on the input of the reference voltage Vref1 and the AC signal, the hysteresis comparator 402 may extract one or more synchronous head signals in the AC signal.

The first processing sub-circuit 403 may be configured to extract information indicating a pulse width or a pulse frequency of the pulse signal. In some embodiments, the information indicating the pulse width of the pulse signal may be extracted by removing a glitch on the pulse signal and perform a signal edge detection. In some embodiments, the information indicating the pulse frequency of the pulse signal may be extracted by counting a number of pulse signals occurring over a measured time duration. The first processing sub-circuit 403 may be further configured to determine whether the data signal is being transmitted from the powered device to the PSE 110 based on the extracted information. Taking a video signal as an exemplary data signal, since the width and/or frequency of a synchronous head signal may be same in different television systems (e.g., the National Television System Committee (NTSC), the Phase Alternation Line (PAL), Séquentiel couleur à mémoire (SECAM)), the first processing sub-circuit 403 may determine whether the pulse signal is a video signal by comparing the pulse width and/or the pulse frequency of its synchronous head signal (e.g., the synchronous head signals extracted by the hysteresis comparator 402 as described above) with a preset range that defines the width and/or frequency of the synchronous head signals in a normal video signal. Merely by way of example, the preset range may be recorded in a table. The pulse width and/or the pulse frequency of the pulse signal may be compared to the preset range(s) by looking up the table. If the pulse width and/or the pulse frequency of the synchronous head signal are within the preset range, respectively, the pulse signal may be deemed as the video signal, that is, the video signal is being transmitted from the powered device to the PSE 110. If the pulse width and/or the pulse frequency of the synchronous head signal are not within the preset range(s), it may be considered that the pulse signal is not the video signal, which means that no video signal is detected.

In some embodiments, as mentioned in FIG. 3, the data signal detection circuit 301 may be omitted from the device detection circuit 205. In such case, in response to a fact that the powered device is a non-PoC device powered by an external power source other than the PSE 110, the resistor detection circuit 302 and the capacitor detection circuit 303 may identify out that fact at a slower rate than the data signal detection circuit 301 does. In response to a fact that the powered device is a PoC device powered by an external power source other than the PSE 110, the resistor detection circuit 302 and the capacitor detection circuit 303 may determine that the powered device is a PoC device, while the PSE 110 may still be instructed to supply the electric power to the PoC device, which may damage the PoC device. Therefore, the data signal detection circuit 301 may be utilized to determine whether the powered device has been powered by an external power source other than the PSE 110 quickly, and the resistor detection circuit 302 and the capacitor detection circuit 303 may be further utilized to determine whether the powered device is a PoC device or a non-PoC device.

Figure 5:
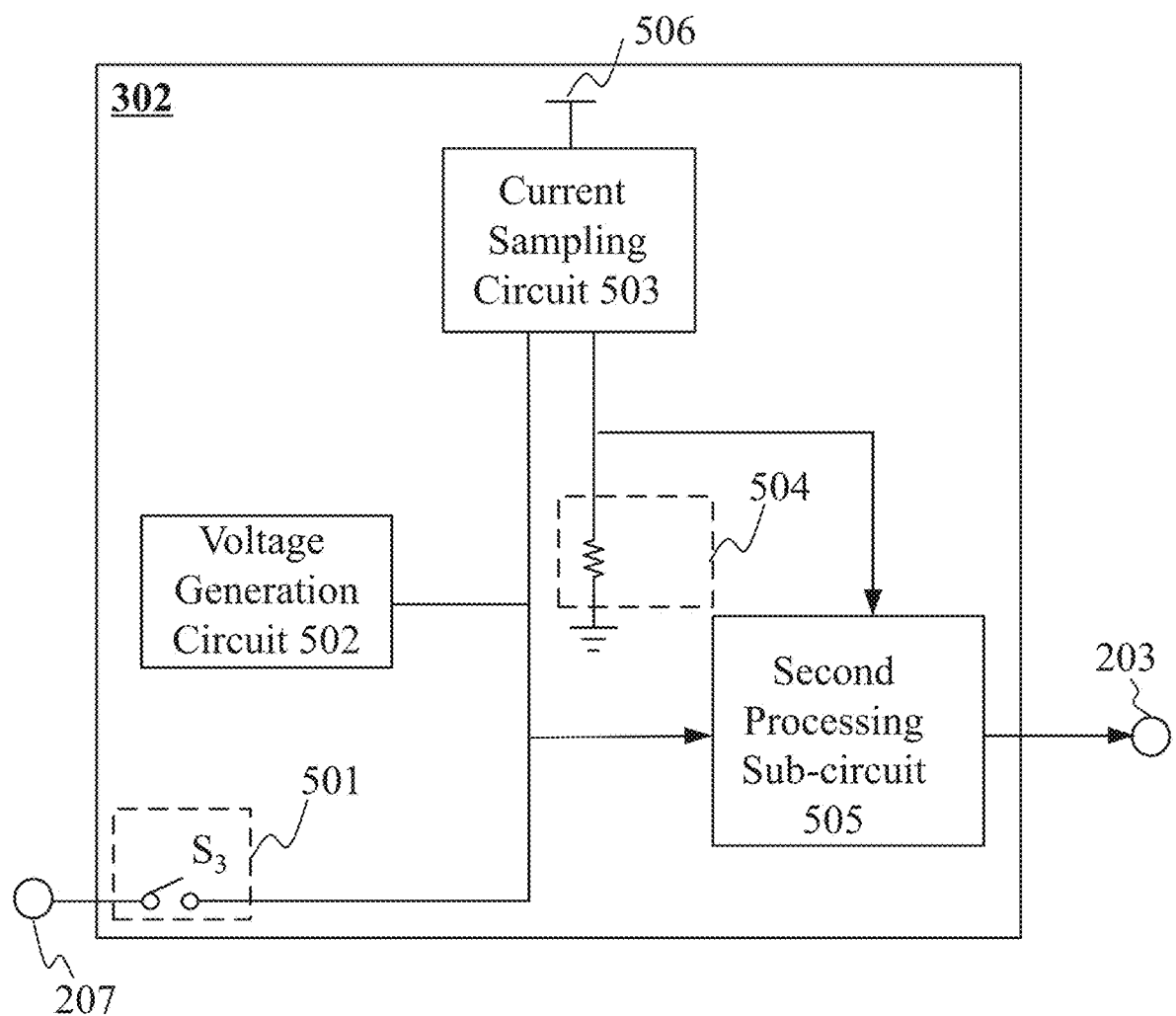
FIG. 5 is a schematic diagram illustrating an exemplary circuit of a resistor detection circuit according to some embodiments of the present disclosure.

FIG. 5 is a schematic diagram illustrating an exemplary circuit of the resistor detection circuit 302 according to some embodiments of the present disclosure. As described in FIG. 3, the resistor detection circuit 302 may be configured to determine whether a resistance of a powered device (e.g., the PD 120) satisfies the first preset condition. As shown in FIG. 5, the resistor detection circuit 302 may include a second switch 501, a voltage generation circuit 502, a current sampling circuit 503, a first resistor 504, a second processing sub-circuit 505, and a power supply 506. A first end of the second switch 501 may be coupled to the output terminal 207. The voltage generation circuit 502 and the current sampling circuit 503 may be coupled to a second end of the second switch 501. The first resistor 504, the second processing sub-circuit 505, and the power supply 506 may be coupled to the current sampling circuit 503. The second processing sub-circuit 505 may be coupled to the switch 203.

The second switch 501 may be turned on when a data signal detection circuit (e.g., the data signal detection circuit 301 in FIG. 4) does not detect any data signal (e.g., video signal) transmitted from the powered device to the PSE 110. Then, the power supply 506 may be configured to supply electric power to the resistor detection circuit 302 when the second switch 501 is turned on.

The voltage generation circuit 502 may be configured to provide a voltage for the powered device when the second switch 501 is turned on. Then, a current may pass through a ground resistor of the powered device due to the voltage. For example, the voltage generation circuit 502 may apply a voltage $V_1$ to the output terminal 207. The voltage $V_1$ may be delivered to the PD 120 via the coaxial cable 130, and a current $I_1$ may be generated due to the voltage $V_1$.

The current sampling circuit 503 may be configured to sample the current of the output terminal 207 to obtain a sampling current when the second switch 501 is turned on. In some embodiments, the current sampling circuit 503 may be a current mirror circuit that may generate a sampling current (e.g., a sampling current $I_s$) equal to the current passing through the ground resistor of the powered device (e.g., $I_1$).

The sampling current may pass through the first resistor 504, and a voltage (denoted as $Vc_1$) across the first resistor 504 may be generated. Since the resistance (denoted as $R_1$) of the first resistor 504 is known, the voltage $Vc_1$ may be calculated, which is equal to a product of the sampling current $I_s$ and the resistance $R_1$, i.e., $Vc_1 = I_1 R_1$.

The second processing sub-circuit 505 may be configured to determine the resistance of the powered device based on the voltage $Vc_1$ across the first resistor. In some embodiments, the second processing sub-circuit 505 may determine code words of the voltage $V_1$ and the current $I_1$ based on an input of the voltage $V_1$ and the voltage $Vc_1$. In some embodiments, the second processing sub-circuit 505 may include an analog-to-digital converter (ADC) and a digital processing circuit. The ADC may digitize the voltage $V_1$ and the voltage $Vc_1$. The digital processing circuit may generate the code words of the voltage $V_1$ and the current $I_1$ based on the digitized voltage $V_1$ and the voltage $Vc_1$. Then, the voltage generation circuit 502 may supply a voltage $V_2$ for the powered device, and a current $I_2$ may pass through the ground resistor of the powered device due to the voltage $V_2$. The code words of the voltage $V_2$ and the current $I_2$ may be determined in a similar manner with that of the voltage $V_1$ and the current $I_1$. In some embodiments, a resistance (denoted as R) of the powered device may be determined based on the code words of the voltage $V_1$, the current $I_1$, the voltage $V_2$, and the current $I_2$ according to Equation (1) as below:

$$R = \frac{V_2 - V_1}{I_2 - I_1}, \quad \text{Equation (1)}$$

The second processing sub-circuit 505 may be further configured to determine whether the resistance R of the powered device satisfies the first preset condition. In some embodiments, the first preset condition may be that the resistance of the powered device is within a first range. Since a ground impedance of a standard PoC device is a first fixed value, the first range may be a possible variation range with respect to the first fixed value. If the resistance R is within the first range, the powered device may then undergo a capacitor detection performed by the capacitor detection circuit 303 as described in FIG. 6. If the resistance R is out of the first range, the powered device may be considered as a non-PoC device. In such case, the switch 203 may be turned off to prevent the PSE 110 from supplying the power signal to the powered device. Moreover, the second switch 501 may be turned off to terminate the operation of the resistor detection circuit 302. After a certain time delay, the data signal detection circuit 301 may be configured to detect whether the data signal is being transmitted from the powered device to the PSE 110 again.

In some embodiments, the resistance R may be determined as a division of the voltage applied to the powered device and the corresponding current passing through the output terminal 207, such as $$\frac{V_1}{I_1} \text{ or } \frac{V_2}{I_2}.$$

In some alternative embodiments, due to a current misalignment caused by the current sampling circuit 503 and a disorder of the second processing sub-circuit 505, the actual digitized voltage may be different from the voltage $V_1$ by an error $\Delta V$, and the actual current passing through the output terminal 207 may be different from the current $I_1$ by an error $\Delta I$. Thus, the resistance of the powered device may be determined to be equal to $$\frac{V_1 + \Delta V}{I_1 + \Delta I},$$

which has a deviation from $$\frac{V_1}{I_1},$$

thereby causing an inaccurate determination as to whether the resistance of the powered device is within the first range. The errors $\Delta V$ and $\Delta I$ may be removed by using the resistor detection circuit 302. Since the errors $\Delta V$ and $\Delta I$ are caused by the current misalignment and the disorder of the resistor detection circuit 302, the errors $\Delta V$ and $\Delta I$ may be considered as default values. In this way, the resistance R of the powered device may be represented by Equation (2), as below:

$$R = \frac{(V_1 + \Delta V)_-(V_2 + \Delta V)}{(I_1 + \Delta I) - (I_2 + \Delta I)} = \frac{V_2 - V_1}{I_2 - I_1}, \quad \text{Equation (2)}$$

It can be noted that the errors $\Delta V$ and $\Delta I$ are removed by using Equation (2), thereby improving the reliability of the resistor detection circuit 302.

Figure 6:
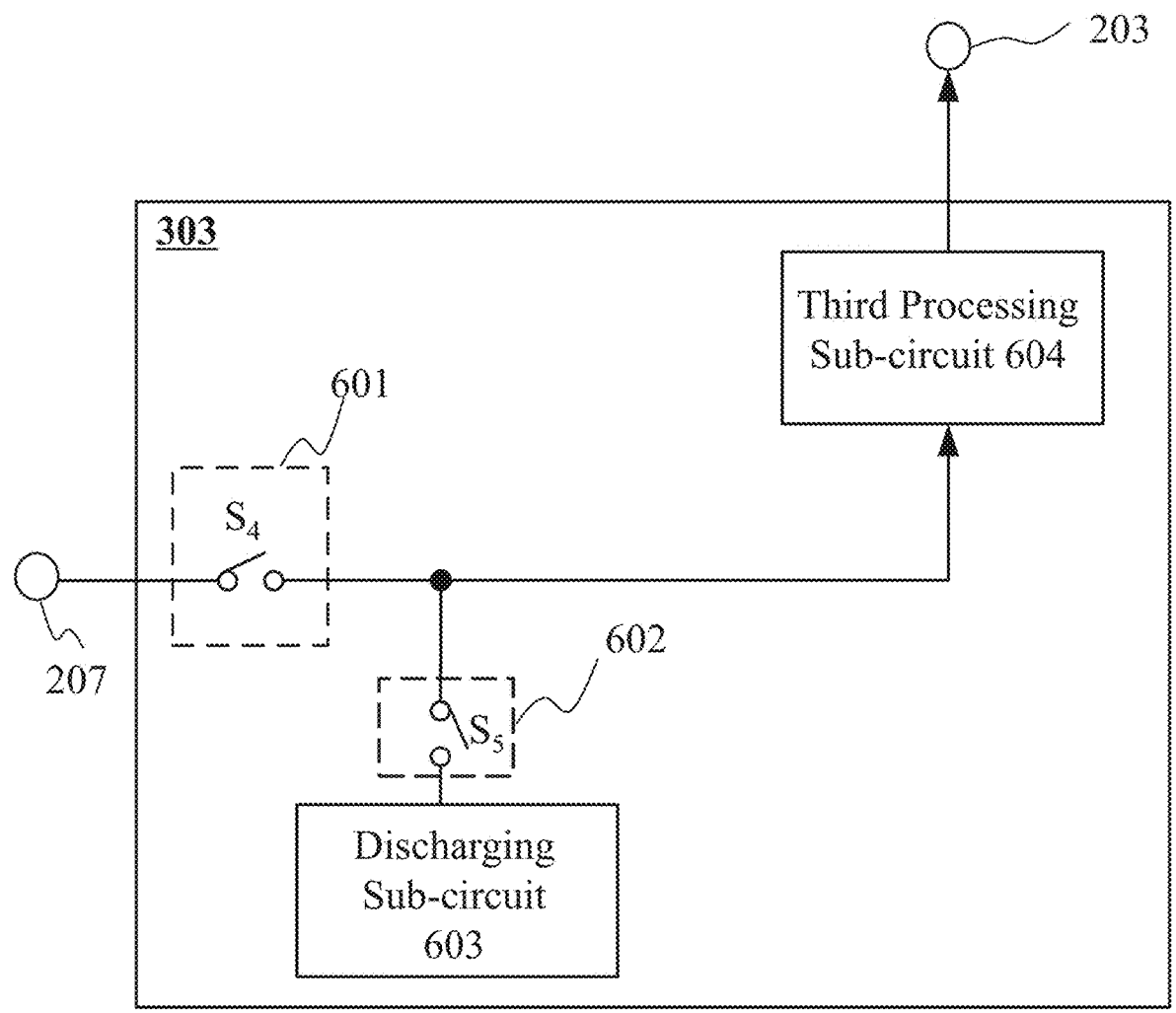
FIG. 6 is a schematic diagram illustrating an exemplary circuit of a capacitor detection circuit according to some embodiments of the present disclosure.

FIG. 6 is a schematic diagram illustrating an exemplary circuit of the capacitor detection circuit 303 according to some embodiments of the present disclosure. As described in connection with FIG. 3, the capacitor detection circuit 303 may be configured to determine whether a capacitance of a powered device (e.g., the PD 120) satisfies the second preset condition. As shown in FIG. 6, the capacitor detection circuit 303 may include a third switch 601, a switch 602, a discharging sub-circuit 603, and a third processing sub-circuit 604. A first end of the third switch 601 may be coupled to the output terminal 207. A first end of the switch 602 may be coupled to a second end of the third switch 601, and a second end of the switch 602 may be coupled to the discharging sub-circuit 603. The third processing sub-circuit 604 may be coupled to the second end of the third switch 601 and the second end of the switch 602. The third processing sub-circuit 604 may be coupled to the switch 203.

In some embodiments, the third switch 601 may be configured to be turned on when the resistance of the powered device satisfies the first preset condition. Alternatively, the third switch 601 may be configured to be turned on when the data signal detection circuit 301 determines that a data signal is transmitted from the powered device to the PSE 110.

The switch 602 may be configured to be turned on to connect the discharging sub-circuit 603 and the third switch 601. The second switch 501 may include a digital control switch S5.

Figure 9:
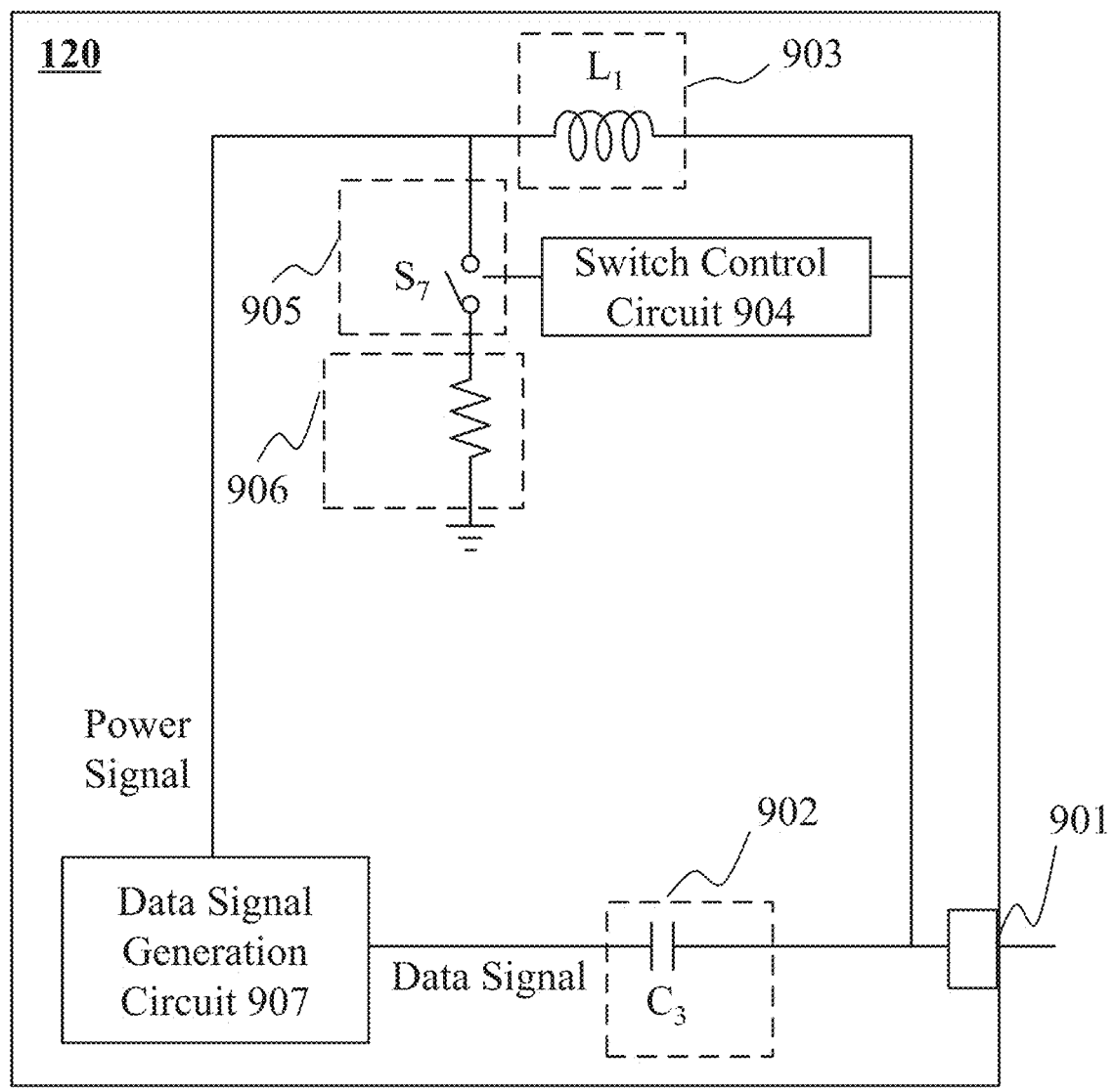
FIG. 9 is a schematic diagram illustrating an exemplary circuit of a powered device according to some embodiments of the present disclosure.

The discharging sub-circuit 603 may be configured to discharge a current from the output terminal 207 when the switches 601 and 602 are turned on. In some embodiments, the discharged current may be a constant current. The powered device may include an electrical power storage module, for example, a capacitor $C_3$ as shown in FIG. 9. In some embodiments, the voltage of the electrical power storage module may be equal to the last voltage (e.g., the voltage $V_2$) applied to the powered device by the resistor detection circuit 302. Thus, the voltage applied to the output terminal 207 by the electrical power storage module (for brevity, also referred as to the voltage on the output terminal 207) may be equal to the last voltage applied to the powered device by the resistor detection circuit 302. After a certain duration (denoted as t), the voltage on the output terminal 207 may decrease to a value $V_3$.

The third processing sub-circuit 604 may be configured to determine a capacitance of the powered device based on the discharging of the current. The third processing sub-circuit 604 may measure the voltage on the output terminal 207. For example, the third processing sub-circuit 604 may determine that the voltage on the output terminal 207 is equal to $V_2$ when the switches 601 and 602 are turned on, and is equal to $V_3$ after the certain duration t. Assuming that the discharged current is a constant current ID, the capacitance (denoted as C) of the powered device may be determined according to Equation (3) as below:

$$C = \frac{ID \cdot t}{V_2 - V_3}, \quad \text{Equation (3)}$$

The third processing sub-circuit 604 may be further configured to determine whether the capacitance of the powered device satisfies the second preset condition. In some embodiments, the second preset condition may be that the capacitance of the powered device is within a second range. Since the capacitance of a standard PoC device is a second fixed value, the second range may be a possible variation range with respect to the second fixed value. If the resistance R is within the second range, the powered device may be considered as a PoC device. In such case, the switch 203 may be turned on so as to enable the PSE 110 to supply the power signal to the powered device. Moreover, the second switch 501 and the third switch 601 may be turned off to terminate the operation of the capacitor detection circuit 303. If the capacitance C is out of the second range, the powered device may be considered as a non-PoC device. In such case, the switch 203 may keep turned off to prevent the PSE 110 from supplying the power signal to the PD 120. Moreover, the third switch 601 may be turned off to terminate the operation of the capacitor detection circuit 303. After a certain time delay, the data signal detection circuit 301 may be configured to detect whether the data signal is being transmitted from the powered device to the PSE 110 again. In some embodiments, the second processing sub-circuit 505 and the third processing sub-circuit 604 may be integrated into one circuit.

In some embodiments, the capacitor detection circuit 303 may be used to determine whether the capacitance of the powered device satisfies the second preset condition, after the resistor detection circuit 302 determines that the resistance of the powered device satisfies the first preset condition. In such case, the electrical power storage module of the powered device may be charged during the operation of the resistor detection circuit 302, thereby reducing the total time for the operation of the capacitor detection circuit 303. Optionally, the resistor detection circuit 303 may be used to determine whether the resistance of the powered device satisfies the first preset condition, after the capacitor detection circuit 303 determines that the capacitance of the powered device satisfies the first preset condition.

Figure 7:
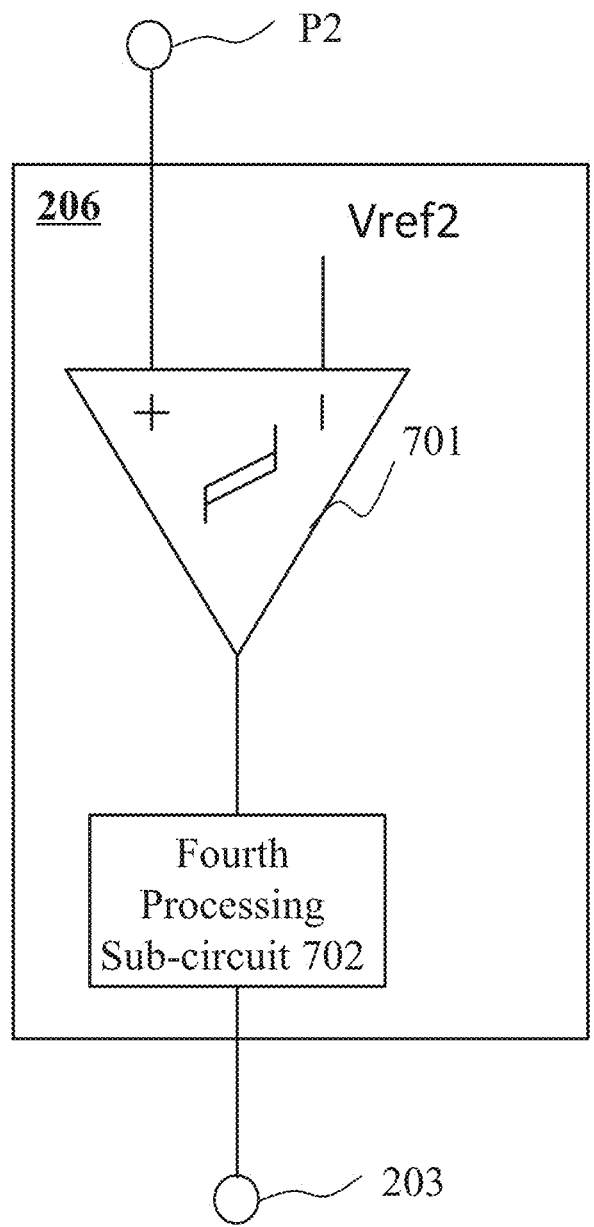
FIG. 7 is a schematic diagram illustrating an exemplary circuit of a load detection circuit according to some embodiments of the present disclosure.

FIG. 7 is a schematic diagram illustrating an exemplary circuit of the load detection circuit 206 according to some embodiments of the present disclosure. As described in connection with FIG. 2, the load detection circuit 206 may be configured to detect whether a load of a powered device (e.g., the PD 120) is disconnected. As shown in FIG. 7, the load detection circuit 206 may include a hysteresis comparator 701 and a fourth processing sub-circuit 702. The hysteresis comparator 701 may have a forward input terminal coupled to the first end P2 of the resistor 202 and an inverted input terminal configured to receive a second reference voltage Vref2. The fourth processing sub-circuit may be coupled to the output terminal of the hysteresis comparator 701 and the switch 203.

In some embodiments, there may be a possibility that a load of the powered device in a PoC system (e.g., the PoC system 100) is disconnected. The load detection circuit 206 may determine whether the load of the powered device is disconnected in a first case and a second case, respectively.

In the first case, the switch 203 in FIG. 2 may be turned on, and the PSE 110 may power on the powered device with the power signal. If the load of the powered device is connected, the powered device and the resistor 202 may share the voltage provided by the input terminal 201, and a current may simultaneously pass through the resistor 202 and the powered device. As a result, there may be a drop of voltage across the resistor 202 in the path between the input terminal 201 and the output terminal 207 due to the resistance of the resistor 202 and the current. The load detection circuit 206 may determine the connection status of the load of the powered device by monitoring the drop of voltage across the resistor 202. If the load of the powered device is disconnected, the current may decrease or disappear, and the drop of voltage across the resistor 202 may decrease, and the voltage at the first end P2 (for brevity, referred as to the voltage at P2) of the resistor 202 may increase. Therefore, the load detection circuit 206 may determine whether the load of the powered device is disconnected based on the drop of voltage across the resistor.

In some embodiments, the second reference voltage Vref2 may be determined based at least on the resistance of the resistor 202 and a rated parameter (e.g., a rated current) of the powered device. For example, if the resistance of the resistor 202 is 0.25 ohms, and a rated current of the powered device is 7.5 mA, when the current passing through the resistor 202 and the powered device is equal to the rated current, the drop of voltage across the resistor 202 may be substantially equal to 1.875 mV. In such case, to ensure that the powered device is operating at the rated current, the second reference voltage Vref2 may be determined as a difference between the voltage (denoted as Vpower) provided by the input terminal 201 and the drop of voltage across the resistor 202, that is, (Vpower-1.875 mV). Optionally, the second reference voltage Vref2 may be determined based on the resistance of the resistor 202 and a minimum current that enables the powered device to operate, in a similar manner with the determination of Vref2 based on the resistance of the resistor 202 and the rated current of the powered device.

In some embodiments, the hysteresis comparator 701 and the fourth processing sub-circuit 702 may be used to determine whether the load of the powered device is disconnected based on the voltage at P2 and the second reference voltage Vref2 according to a first determination criterion. The first determination criterion may refer to that, in the condition that the switch 203 is turned on (i.e., when the powered device is being powered by the PSE 110), if the voltage at P2 is greater than the second reference voltage Vref2, the load of the powered device may be considered to be disconnected; otherwise, the load of the powered device may be considered to be connected. The hysteresis comparator 701 may be configured to output an output signal indicating a comparison result of the voltage at P2 and the second reference voltage Vref2 based on the voltage at P2 received by the forward input terminal and the second reference voltage Vref2 received by the inverted input terminal. The fourth processing sub-circuit 702 may further control the operation of the switch 203 according to the output signal of the hysteresis comparator 701. As shown in FIG. 7, the voltage at P2 and the second reference voltage Vref2 may be input into the forward and inverted input terminal(s) of the hysteresis comparator 701, respectively. If the output termination of the hysteresis comparator 701 outputs a low voltage level (e.g., "0"), it may indicate that the voltage at P2 is smaller than the second reference voltage Vref2, which indicates that the load of the powered device is being connected. In such case, the fourth processing sub-circuit 702 may keep the switch 203 turned on, so that the PSE 110 may continue supplying the power signal to the powered device. If the output terminal of the hysteresis comparator 701 outputs a high voltage level (e.g., "1") for a time period over a preset duration, it may indicate that the voltage at P2 is greater than the second reference voltage Vref2, which indicates that the load of the powered device is disconnected. In such case, the fourth processing sub-circuit 702 may control the switch 203 to be turned off to prevent the PSE 110 from supplying the electric power to the powered device. After a certain delay, the data signal detection circuit 301 may detect whether a data signal is being transmitted from the powered device to the PSE 110 again.

In the second case, the switch 203 in FIG. 2 may be turned off, and the powered device may be powered by an external power source. In some embodiments, the load detection circuit 206 may further include a data signal detection sub-circuit same as or similar to the data signal detection circuit 301. The data signal detection sub-circuit may be configured to determine whether the load of the powered device is disconnected according to a second determination criterion. For example, the data signal detection sub-circuit may determine whether the load of the powered device is disconnected in a similar manner with the detection of whether a data signal is being transmitted from the powered device to the PSE 110 as described in FIG. 4. Specifically, the data signal detection sub-circuit may receive a signal transmitted from the powered device, extract a pulse signal therefrom, and determine a pulse width and a pulse frequency of the pulse signal. The second determination criterion may refer to that, in the condition that the switch 203 is turned off (i.e., when the powered device is being powered by an external power source), if the pulse width and/or the pulse frequency of a pulse signal acquired from the signal conform to that of the specific data signal (e.g., within the preset ranges of the synchronous head width and frequency of the video signal), the load of the powered device may be connected; or else, the data signal may be considered to be lost, and the load of the powered device may be considered as being disconnected. After a certain delay, the data signal detection circuit 301 may be configured to detect whether the data signal is being transmitted from the powered device to the PSE 110 again. Optionally, the above operation of the data signal detection sub-circuit may be executed by the data signal detection circuit 301.

In some embodiments, the data signal detection sub-circuit may be used in the first case in a similar way with that in the second case. However, when the power of the powered device changes greatly in some conditions (e.g., a day-night switch, a focus change of the PD 120), the power signal may fluctuate greatly accordingly, causing the data signal to fluctuate greatly. The fluctuated data signal may result in a wrong load detection result. Compared to the data signal detection circuit 301, the hysteresis comparator 701 and the fourth processing sub-circuit 702 may be more reliable in the load detection.

Figure 8:
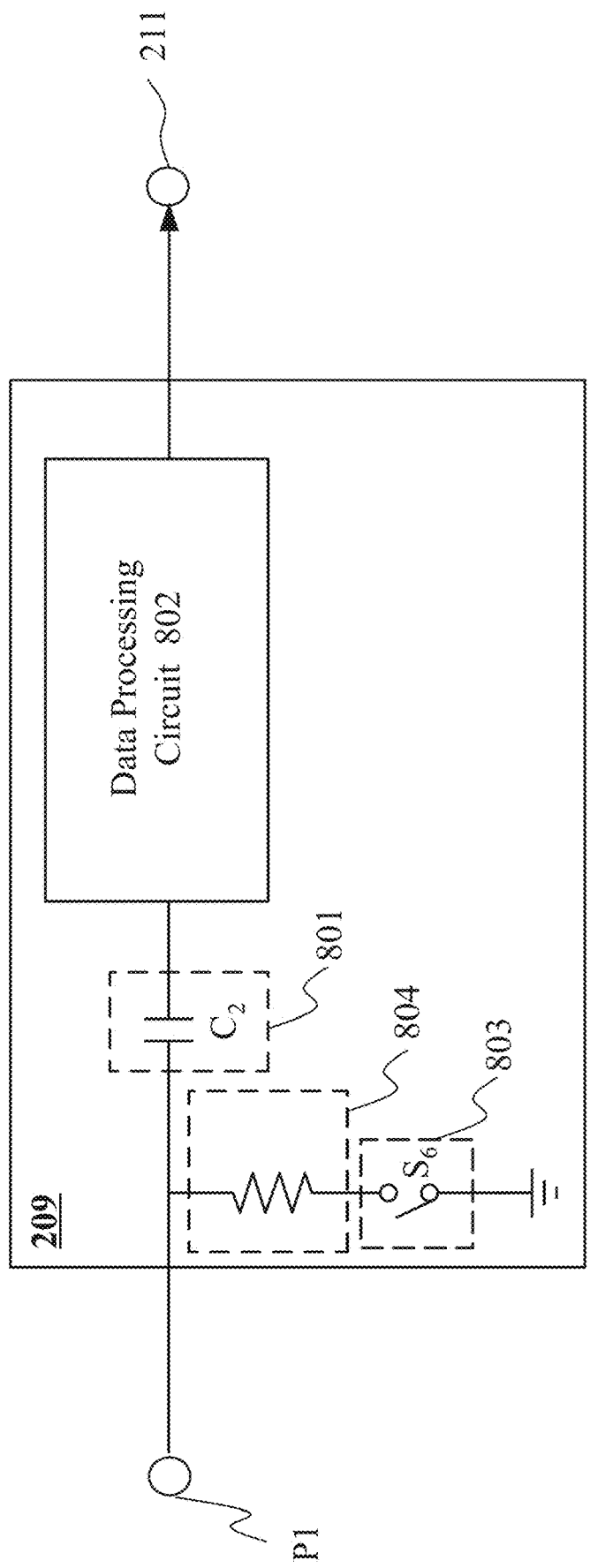
FIG. 8 is a schematic diagram illustrating an exemplary circuit of a data processing unit according to some embodiments of the present disclosure.

FIG. 8 is a schematic diagram illustrating an exemplary circuit of the data processing unit 209 according to some embodiments of the present disclosure. As described in FIG. 8, the data processing unit 209 may be configured to process the data signal when the PSE 110 supplies the power signal to a powered device (e.g., the PD 120 in FIG. 1). As shown in FIG. 8, the data processing unit 209 may include a second capacitor 801, a data processing circuit 802, a switch 803, and a second resistor 804. A first end of the second capacitor 801 may be coupled to the second end P1 of the data signal filtering circuit 204, and the second end of the second capacitor 801 may be coupled to the data processing circuit 802. The data processing circuit 802 may be coupled to the data signal output terminal 211. A first end of the second resistor 804 may be coupled to the second end P1 of the data signal filtering circuit 204 and the first end of the second capacitor 801. A second end of the second resistor 804 may be coupled to a first end of the switch 803. A second end of the switch 803 may be grounded.

The second capacitor 801 may allow the data signal from the powered device to path through and block the power signal. In some embodiments, the powered device may be a video monitoring device (e.g., a PoC camera) powered by the PSE 110 (i.e., the switch 203 is turned on). The data signal received from the powered device may be a video signal. The second capacitor 801 may allow the video signal to reach at the data processing circuit 802 for further processing.

The data processing circuit 802 may be configured to process the data signal. Due to the influence of a capacitor (e.g., the capacitor $C_0$, the second capacitor 801), an inductor (e.g., the inductor $I_0$) of the PSE 110, and a frame rate of the video signals, the video signal may be attenuated. In addition, the video signal may fluctuate as a whole with a power change of the powered device. In some embodiments, the data processing circuit 802 may perform a lowpass filtering on the data signal, and determine whether the filtered data signal includes an error signal whose voltage is out of a preset range. The data processing circuit 802 may filter the error signal and perform a video compensation on the data signal that undergoes the lowpass filtering and the error signal filtering. It shall be noted that, when the PSE 110 is supplying the power signal to the powered device, the data processing unit 209 may improve the quality of the data signal that the PSE 110 receives from the powered device.

The second resistor 804 may be grounded for impedance matching when the switch 803 is turned on, so as to maximize a power transfer from the powered device.

If the powered device is powered by an external power source, the switch 203 may be turned off. Thus, the data signal that the PSE 110 received from the powered device may not be affected by the powered device and the PSE 110. In this way, the switch 210 may be turned on so that the data signal may be directly transmitted to the data signal output terminal 211. In such case, the second resistor 804 needs not to perform the impedance matching and the switch 801 may be turned off.

FIG. 9 is a schematic diagram illustrating an exemplary circuit of the PD 120 according to some embodiments of the present disclosure. As shown in FIG. 9, the PD 120 may include an output terminal 901, a power signal filtering circuit 902, a data signal filtering circuit 903, a switch control circuit 904, a switch 905, a resistor 906, and a data signal generation circuit 907. The output terminal 901 may be coupled to a coaxial cable (e.g., the coaxial cable 130). A first end of the power signal filtering circuit 902 may be coupled to the data signal generation circuit 907, and a second end of the power signal filtering circuit 902 may be coupled to the output terminal 901. A first end of the data signal filtering circuit 903 may be coupled to the data signal generation circuit 907, and a second end of the data signal filtering circuit 903 may be coupled to the output terminal 901. A first end of the switch 905 may be coupled to the first end of the data signal filtering circuit 903. A first end of the resistor 906 may be coupled to a second end of the switch 905, and a second end of the resistor 906 may be grounded. A first end of the switch control circuit 904 may be coupled to a control end (i.e., a second end) of the switch 905, and a second end of the switch control circuit 904 may be coupled to the second end of the data signal filtering circuit 903.

In some embodiments, the output terminal 901 may be electrically coupled to a power sourcing equipment (e.g., the PSE 110 in FIG. 1) via the coaxial cable.

As shown in FIG. 9, the power signal filtering circuit 902 may include a capacitor $C_3$, and the data signal filtering circuit 903 may include an inductor $L_1$. Since the inductor $L_1$ presents low resistance to a DC signal, and the capacitor $C_3$, presents high resistance to the DC signal, the resistance of the PD 120 may be mainly contributed by the resistor 906. In some embodiments, the first range described in connection with FIG. 5 may vary with the resistance of the resistor 906. In some embodiments, an ordinary non-PoC device may have no capacitance or have a capacitance less than 10 uF, and the capacitance of an ordinary PoC device may be generally above 100 uF that is far more greater than 10 uF, thus a capacitance of the PD 120 being the PoC device may be mainly contributed by the capacitor $C_3$. In some embodiments, the second range described in connection with FIG. 6 may vary with the capacitance of the capacitor $C_3$. As described in FIG. 6, the capacitor $C_3$ may be used as an electrical power storage module when determining the capacitance of the PD 120.

The data signal filtering circuit 903 may allow the power signal transmitted from the power sourcing equipment to pass through and filter out an AC signal.

The switch control circuit 904 may turn on the switch 905 when the power sourcing equipment is not supplying the power signal to the PD 120, thereby ensuring that the resistor 906 is connected during the determination of whether the resistance of the PD 120 satisfies the first preset condition as described in FIG. 5. The switch control circuit 904 may turn off the switch 905 when the power sourcing equipment is supplying the power signal to the PD 120, thereby reducing unnecessary power consumption on the resistor 906. Thus, the switch 905 may optimize the power consumption performance of the PD 120. Optionally, the switch 905 may be omitted so that the resistor 906 may be always connected.

The data signal generation circuit 907 may be configured to generate the data signal. The data signal generation circuit 907 may include an image sensor, a video sensor, an audio sensor, or the like. For example, the video sensor may be part of a video surveillance system and generate a video signal corresponding to a specific scene. The data signal generation circuit 907 may receive the power signal via the data signal filtering circuit 903, and transmit the data signal to the output terminal via the power signal filtering circuit 902.

It should be noted that the above circuits illustrated in FIGS. 2 to 9 and the descriptions thereof are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, any one of the circuits illustrated in FIGS. 2 to 9 may include one or more additional components and/or one or more components thereof described above may be omitted. For example, the second capacitor 801 may be omitted. In addition, the equations provided above are illustrative examples and can be modified in various ways. For example, the resistance of the powered device may be determined based on three or more voltages applied to the output terminal 207 and the corresponding current, thus equation (1) may be modified accordingly.

Figure 10:
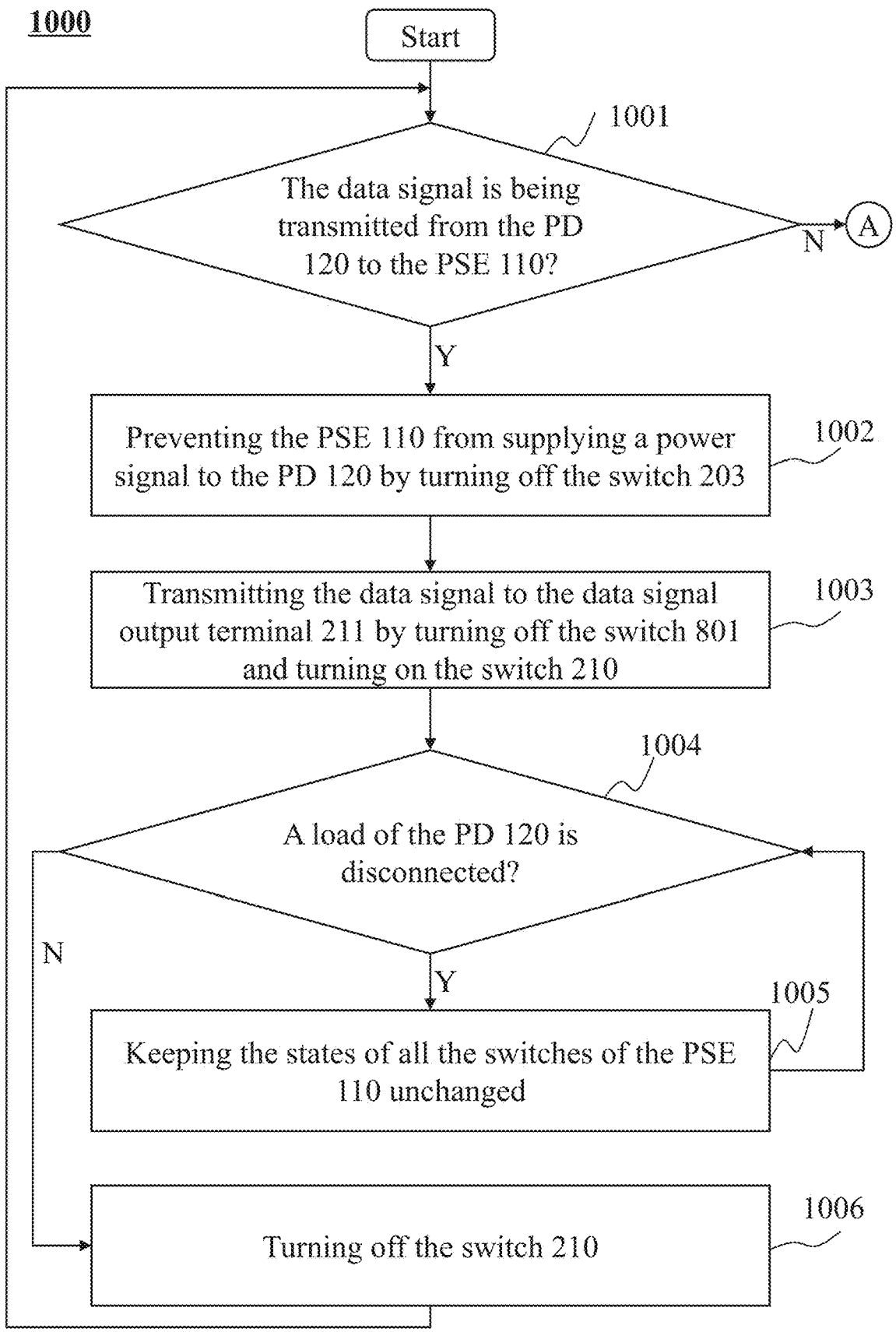
FIG. 10 is a flowchart illustrating an exemplary process for determining whether a data signal is being transmitted from the powered device to the power sourcing equipment according to some embodiments of the present disclosure.

FIG. 10 is a flowchart illustrating an exemplary process 1000 for determining whether a data signal is being transmitted from a powered device to a power sourcing equipment according to some embodiments of the present disclosure. For illustration purposes, in FIGS. 10 and 11, the PSE 110 illustrated in FIG. 2 and the PD 120 illustrated in FIG. 9 may be taken as an exemplary power sourcing equipment and an exemplary powered device, respectively.

In 1001, the PSE 110 (e.g., the data signal detection circuit 301) may detect whether the data signal is being transmitted from the PD 120 to the PSE 110. If the data signal is not being transmitted from the PD 120 to the PSE 110, the PSE 110 may proceed to node A followed by the process 1100 shown in FIG. 11. If the data signal is being transmitted from the PD 120 to the PSE 110, the PD 120 may be considered as a PoC device or a non-PoC device that is powered by an external power source.

In 1002, the switch 203 may be turned off to prevent the PSE 110 from supplying the power signal to the PD 120.

In 1003, the switch 803 may be turned off, and the switch 210 may be turned on, so as to transmit the data signal to the data signal output terminal 211 for output.

In 1004, the PSE 110 (e.g., the data signal detection circuit 301) may determine whether a load of the PD 120 is disconnected.

If the data signal is being transmitted from the PD 120 to the PSE 110, the load of the PD 120 is not disconnected. In 1005, the states of all the switches of the PSE 110 may be kept unchanged. Then, the operation 1004 may be repeated.

If no data signal is being transmitted from the PD 120 to the PSE 110, the load of the PD 120 is disconnected. In 1006, the switch 210 may be turned off. After a certain delay, the PSE 110 may proceed to the operation 1001 for a next round of determination as to whether the data signal is being transmitted from the PD 120 to the PSE 110.

Figure 11:
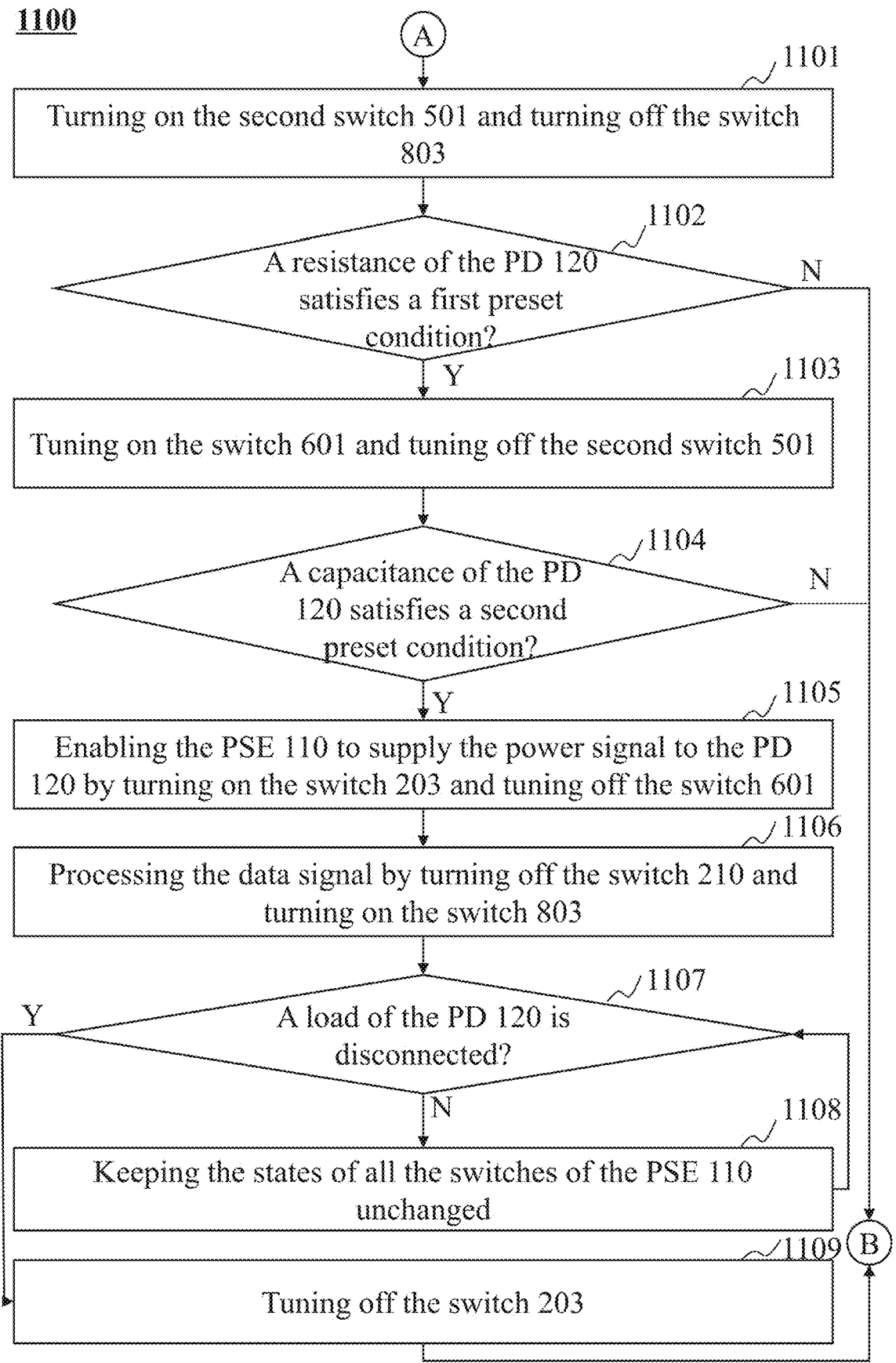
FIG. 11 is a flowchart illustrating an exemplary process for determining whether the powered device is a PoC device according to some embodiments of the present disclosure.

FIG. 11 is a flowchart illustrating an exemplary process 1000 for determining whether the PD is a PoC device according to some embodiments of the present disclosure. As shown in FIG. 11, the node A may be followed by an operation 1101. A node B herein may be followed by the operation 1001 of the process 1000.

Referring back to the operation 1001 in FIG. 10, if no data signal is being transmitted from the PD 120 to the PSE 110, the PD 120 may be in the power-off state. In 1101, the second switch 501 may be turned on, so as to electrically connect the PD 120 and the resistor detection circuit 302 of the PSE 110. In addition, the switch 803 may be turned off.

In 1102, the PSE 110 (e.g., the resistor detection circuit 302) may determine whether a resistance of the PD 120 satisfies the first preset condition. If the resistance of the PD 120 does not satisfy the first preset condition, the PD 120 may be determined as a non-PoC device. In such case, after a certain delay, the PSE 110 may proceed to node B for a next round of determination as to whether the data signal is being transmitted from the PD 120 to the PSE 110.

If the resistance of the PD 120 satisfies the first preset condition, in 1103, the third switch 601 may be turned on, so as to electrically connect the PD 120 and the capacitor detection circuit 303 of the PSE 110. In the meantime, the second switch 501 may be turned off.

In 1104, the PSE 110 (e.g., the capacitor detection circuit 303) may determine whether a capacitance of the PD 120 satisfies the second preset condition. If the capacitance of the PD 120 does not satisfy the second preset condition, the PD 120 may be determined as a non-PoC device. In such case, after a certain delay, the PSE 110 may proceed to node B for a next round of determination as to whether the data signal is being transmitted from the PD 120 to the PSE 110.

If the capacitance of the PD 120 satisfies the second preset condition, the PD 120 may be determined as a PoC device. In 1105, the switch 203 may be turned on, so as to enable the PSE 110 to supply the power signal to the PD 120. In the meantime, the third switch 601 may be turned off.

In 1106, the PSE 110 (e.g., the data processing unit 209) may process the data signal by turning off the switch 210 and turning on the switch 803, so as to improve the quality of the data signal that the PSE 110 receives from the powered device.

In 1107, the PSE 110 (e.g., the load detection circuit 206) may determine whether a load of the PD 120 is disconnected based on a drop of voltage across the resistor 202. If the load of the PD 120 is not disconnected, in 1108, the states of all the switches of the PSE 110 may be kept unchanged. Then, the operation 1107 may be repeated.

If the load of the PD 120 is disconnected, in 1109, the switch 203 may be turned off to stop supplying the power signal to the PD 120. After a certain delay, the PSE 110 may proceed to node B for a next round of determination as to whether the data signal is being transmitted from the PD 120 to the PSE 110.

The purpose for turning off the switch 803 in the operation 1101 may be to prevent the voltage generation circuit 502 from charging the power signal filtering circuit 208 in the operation 1102. Since a capacitance of the power signal filtering circuit 208 approximates the capacitance of the power signal filtering circuit 902, the switch 803 need be turned off, so that the power signal filtering circuit 208 may not be grounded. In this way, the voltage generation circuit 502 may only charge the power signal filtering circuit 902, and the power signal filtering circuit 208 may not be charged, thereby removing the influence of the power signal filtering circuit 208 and improving the reliability of the determination result of the operation 1102.

It should be noted that the above descriptions regarding the processes 1000 and 1100 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processes 1000 and 1100 may be accomplished with one or more additional operations not described and/or without one or more of the operations discussed above. For example, the node B may refer to an end of the process 1100. Additionally, the order of the process 1100 may not be intended to be limiting. For example, the operations 1103 and 1104 may be performed before the operations 1101 and 1102.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A power sourcing equipment, comprising:
   an input terminal configured to receive a power signal;
   an output terminal electrically coupled to a powered device via a coaxial cable, the coaxial cable being configured to transmit the power signal from the power sourcing equipment to the powered device or transmit a data signal from the powered device to the power sourcing equipment;
   a switch coupled between the input terminal and the output terminal, the switch controlling an electrical connection between the input terminal and the output terminal; and
   a device detection circuit coupled to the output terminal and the input terminal, the device detection circuit being configured to detect whether the data signal is being transmitted from the powered device to the power sourcing equipment, and in response to a determination that the data signal is not being transmitted from the powered device to the power sourcing equipment, control an operation of the switch based on an electrical parameter associated with the powered device.

2. The power sourcing equipment of claim 1, further comprising:
   a data signal filtering circuit coupled between the input terminal and the output terminal, the data signal filtering circuit being configured to filter the data signal; and
   a power signal filtering circuit configured to filter the power signal.

3. The power sourcing equipment of claim 1, wherein the device detection circuit includes:
   a data signal detection circuit configured to detect whether the data signal is being transmitted from the powered device to the power sourcing equipment, wherein the data signal detection circuit is configured to:
      acquire a pulse signal from a signal transmitted from the powered device;
      extract information indicating a pulse width or a pulse frequency of the pulse signal; and
      determine whether the data signal is being transmitted from the powered device to the power sourcing equipment based on the information.

4. The power sourcing equipment of claim 1, wherein the electrical parameter associated with the powered device includes a resistance of the powered device, and the device detection circuit includes:
   a resistor detection circuit configured to determine the resistance of the powered device, wherein the device detection circuit controls the operation of the switch based on whether the resistance of the powered device satisfies a first preset condition.

5. The power sourcing equipment of claim 4, wherein the resistor detection circuit includes:
   a second switch, whose first end is coupled to the output terminal, configured to be turned on when the data signal detection circuit does not detect the data signal;
   a voltage generation circuit, coupled to a second end of the second switch, configured to provide a voltage for the powered device when the second switch is turned on;
   a current sampling circuit, coupled to the second end of the second switch, configured to sample a current of the output terminal to obtain a sampling current when the second switch is turned on;
   a first resistor coupled to the current sampling circuit; and
   a second processing sub-circuit configured to determine the resistance of the powered device based on a voltage across the first resistor and the sampling current.

6. The power sourcing equipment of claim 1, wherein the electrical parameter associated with the powered device includes a capacitance of the powered device, and the device detection circuit includes:
   a capacitor detection circuit configured to determine the capacitance of the powered device, wherein the device detection circuit controls the operation of the switch based on whether the capacitance of the powered device satisfies a second preset condition.

7. The power sourcing equipment of claim 6, wherein the capacitor detection circuit includes:
   a third switch whose first end is coupled to the output terminal;
   a discharging sub-circuit, coupled to a second end of the third switch, configured to discharge a current from the output terminal; and
   a third processing sub-circuit configured to determine the capacitance of the powered device based on the discharging of the current.

8. The power sourcing equipment of claim 1, wherein the power sourcing equipment further includes:
   a load detection circuit configured to detect whether a load of the powered device is disconnected, and in response to a determination that the load of the powered device is disconnected, turn off the switch.

9. The power sourcing equipment of claim 6, wherein the load detection circuit includes:
a hysteresis comparator having a forward input coupled to the input terminal and an inverted input configured to receive a reference voltage; and
a fourth processing sub-circuit, coupled to the output terminal of the hysteresis comparator, configured to control the operation of the switch according to an output signal of the hysteresis comparator.

10. The power sourcing equipment of claim 1, further comprising:
a data processing unit configured to process the data signal, wherein the data processing unit includes:
a second capacitor coupled to the power signal filtering circuit;
a second resistor, whose first end is coupled to the power signal filtering circuit and second end is grounded; and
a data processing circuit, coupled to the second end of the second capacitor for processing the data signal.

11. A power sourcing equipment, comprising:
an input terminal configured to receive a power signal;
an output terminal electrically coupled to a powered device via a coaxial cable, the coaxial cable being configured to transmit the power signal from the power sourcing equipment to the powered device or transmit a data signal from the powered device to the power sourcing equipment;
a switch coupled between the input terminal and the output terminal, wherein when the switch is turned on, the power sourcing equipment powers on the powered device with the power signal, and when the switch is turned off, the power sourcing equipment is powered on by an external power source; and
a load detection circuit configured to determinate whether a load of the powered device is disconnected, wherein a first determination criterion is followed when the switch is turned on, and a second determination criterion which is different from the first determination criterion is followed when the switch is turned off.

12. The power sourcing equipment of claim 11, wherein when the switch is turned on, the load detection circuit is configured to:
determine a drop of voltage across a resistor in the path between the input terminal and the output terminal; and
determine whether the load of the powered device is disconnected based on the drop of voltage across the resistor.

13. The power sourcing equipment of claim 11, wherein when the switch is turned off, the load detection circuit is configured to:
acquire a pulse signal from a signal transmitted from the powered device;
extract information indicating a pulse width or a pulse frequency of the pulse signal; and
determine whether the load of the powered device is disconnected based on the information.

14. The power sourcing equipment of claim 12, wherein the load detection circuit includes:
a hysteresis comparator having a forward input coupled to the input terminal and an inverted input configured to receive a reference voltage; and
a fourth processing sub-circuit, coupled to the output terminal of the hysteresis comparator, the fourth processing sub-circuit being configured to control the operation of the switch according to an output signal of the hysteresis comparator.

15. The power sourcing equipment of claim 14, wherein the forward input of the hysteresis comparator is configured to receive a difference between a voltage at the input terminal and the drop of voltage across the resistor, and the output signal of the hysteresis comparator indicates a comparison result of the difference and the reference voltage.

16. The power sourcing equipment of claim 14, wherein the fourth processing sub-circuit is configured to determine whether the load of the powered device is disconnected based on the output signal and a duration of the output signal.

17. The power sourcing equipment of claim 11, further comprising:
a device detection circuit coupled to the output terminal and the input terminal, the device detection circuit being configured to detect whether the data signal is being transmitted from the powered device to the power sourcing equipment, and in response to a determination that the data signal is not being transmitted from the powered device to the power sourcing equipment, control an operation of the switch based on an electrical parameter associated with the powered device.

18. The power sourcing equipment of claim 11, further comprising:
a data signal filtering circuit coupled between the input terminal and the output terminal, the data signal filtering circuit being configured to filter the data signal; and
a power signal filtering circuit configured to filter the power signal.

19. The power sourcing equipment of claim 17, wherein the device detection circuit includes:
a data signal detection circuit configured to detect whether the data signal is being transmitted from the powered device to the power sourcing equipment, wherein the data signal detection circuit is configured to:
acquire a pulse signal from a signal transmitted from the powered device;
extract information indicating a pulse width or a pulse frequency of the pulse signal; and
determine whether the data signal is being transmitted from the powered device to the power sourcing equipment based on the information.

20. The power sourcing equipment of claim 11, further comprising:
a data processing unit configured to process the data signal, wherein the data processing unit includes:
a second capacitor coupled to the power signal filtering circuit;
a second resistor, whose first end is coupled to the power signal filtering circuit and second end is grounded; and
a data processing circuit, coupled to the second end of the second capacitor for processing the data signal.

* * * * *